United States Patent [19]
Holzapfel

[11] Patent Number: 5,994,692
[45] Date of Patent: Nov. 30, 1999

[54] PHOTO-ELECTRIC POSITION MEASURING SYSTEM HAVING A SCANNING GRATING WITH TRANSVERSE GRADUATIONS

[75] Inventor: Wolfgang Holzapfel, Obing, Germany

[73] Assignee: Dr. Johannes Heidenhain GmbH, Traunreut, Germany

[21] Appl. No.: 09/107,641

[22] Filed: Jun. 30, 1998

Related U.S. Application Data

[63] Continuation of application No. 08/616,184, Mar. 15, 1996, abandoned.

[30]    Foreign Application Priority Data

Mar. 25, 1995  [DE]  Germany .......................... 195 11 068

[51] Int. Cl.[6] .................................................. G01B 11/00
[52] U.S. Cl. ....................... 250/237 G; 356/356
[58] Field of Search .......................... 250/237 G; 33/707; 356/356

[56]            References Cited

U.S. PATENT DOCUMENTS

| | | | |
|---|---|---|---|
| 4,519,709 | 5/1985 | Nelle | ........................ 356/373 |
| 4,602,436 | 7/1986 | Ernst | .................. 250/237 G |
| 4,677,293 | 6/1987 | Michel . | |
| 4,778,273 | 10/1988 | Michel | .................... 356/374 |
| 5,033,817 | 7/1991 | Stephens . | |
| 5,214,280 | 5/1993 | Rieder et al. . | |
| 5,264,915 | 11/1993 | Huber et al. . | |
| 5,428,445 | 6/1995 | Holzapfel . | |
| 5,497,226 | 3/1996 | Sullivan | ................. 356/4.01 |
| 5,519,492 | 5/1996 | Holzapfel et al. . | |

FOREIGN PATENT DOCUMENTS

| | | |
|---|---|---|
| 0 163 362 | 6/1988 | European Pat. Off. . |
| 0 220 757 | 3/1990 | European Pat. Off. . |
| 0 498 904 B1 | 11/1994 | European Pat. Off. . |
| 0 547 270 B1 | 5/1995 | European Pat. Off. . |

OTHER PUBLICATIONS

*Theory of Fresnel Images I. Plane Periodic Objects in Monochromatic Light*, "Journal of the Optical Society of America," vol. 33, No. 1, p. 373 (1963).

*Talbot Array Illuminator with Multilevel Phase Gratings*, "Applied Optics," vol. 32, No. 7, pp. 1109–1110 (1993).

*Primary Examiner*—Edward P. Westin
*Assistant Examiner*—Kevin Pyo
*Attorney, Agent, or Firm*—Brinks Hofer Gilson & Lione

[57]            ABSTRACT

A scanning grating is provided in a photo-electric position measuring system and the scanning grating includes several grating areas. Each one of these grating areas has a transverse grating with a graduation period. The transverse gratings of the grating areas are disposed offset by TT/4 perpendicularly to the measuring direction, i.e., in the Y direction, with respect to each other. The partial light beams diffracted at the scanning grating in the +1st and −1st order lead to an intensity modulation at a defined scanning distance Z1. An amplitude grating is provided at the location of this intensity modulation, so that by means of downstream disposed photo-detectors a scanning signal is generated by the +1st diffraction order and a scanning signal, which is phase-shifted by 180° with respect to the first, is generated by the −1st diffraction order.

49 Claims, 16 Drawing Sheets

PHOTO-ELECTRIC POSITION MEASURING SYSTEM HAVING A SCANNING GRATING WITH TRANSVERSE GRADUATIONS

This application is a continuation of application Ser. No. 08/616,184, filed Mar. 15, 1996, now abandoned.

FIELD OF THE INVENTION

The present invention relates to a photo-electric position measuring system wherein the light from a light source is modulated as a function of the position of several gratings which are displaceable with respect to each other, in that light beams diffracted at the gratings interfere with each other, and several photo-detectors are provided to form electrical signals which are phase-shifted with respect to each other.

European Patent Publication No. EP 0 163 362 B1 discloses a position measuring system of this type. A reflecting scale grating is displaceable with respect to a scanning grating. The scanning grating is a phase grating with a defined relationship between the strip widths and the groove widths in order to generate three electrical signals which are phase-shifted by 120° with respect to each other. A group of diffracted rays of the same direction is focused on each of the three detectors. In connection with these groups of diffracting rays of the same direction, reference is also made to so-called resultant diffraction orders. The diffraction rays of the n-th resultant diffraction order are the group of rays which exit the total system of the two gratings directionally in a way as if, aside from the reflection at the scale, they had been deflected at only one grating in the n-th diffraction order.

U.S. Pat. No. 4,677,293 discloses a further position measuring system of this type. The area of a reference marker of a scale consists of a transverse graduation which is scanned by means of a diaphragm structure, i.e., amplitude graduation of the scanning plate. This transverse graduation consists of several strip-shaped diffracting elements which are disposed next to each other in the measuring direction. The diffracting elements are transverse gratings whose grating strips extend parallel with the measuring direction. The individual diffracting elements differ with respect to their transverse graduation periods and therefore deflect an impinging light beam in different directions. If this transverse graduation is illuminated through the gaps of the scanning plate, deflected light beams are generated whose angle of deflection is a function of the transverse graduation period and thus of the illuminated transverse grating area, from which the scale position is derived. Differently deflected light beams are focused by a lens on different photo-detectors in the focal plane of the lens.

European Patent Publication No. EP 0 220 757 B1 discloses a position measuring system in which the scale also has a transverse graduation. The graduation consists of reflecting areas and areas with a transverse graduation disposed alternatingly in the measuring direction. This transverse graduation is a phase grating whose grating parameter has been selected such that the 0-th diffraction order being generated is cancelled and the further diffraction orders do not impinge on the photo-detector. Thus the areas with the transverse graduations are considered by the photo-detectors to be non-reflecting areas.

Cross gratings and chessboard gratings are furthermore known as scales for two measuring directions. The grating lines of the position measuring system in accordance with U.S. Pat. No. 5,264,915, for example, extend diagonally with respect to the two measuring directions so that impinging light is diffracted in two directions. These gratings are not designed for generating scanning signals which are phase-shifted with respect to each other since the transverse grating areas which are located next to each other have a transverse phase shift of 0° or of 180°.

SUMMARY OF THE INVENTION

It is an object of the present invention to create a photo-electric position measuring system which is simply designed and can be cost-effectively produced.

An advantage of the position measuring system in accordance with the present invention lies in that position-dependent scanning signals with high levels and limited frequencies can be generated by means of (quasi) single field scanning, which are indifferent to soiling and/or graduation errors of the scale. In addition, relatively large production tolerances of the phase graduation are permissible, because of which cost-effective production is made possible. A further advantage is that scanning signals which are phase-shifted with respect to each other can be generated in a simple manner.

The present invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 20:
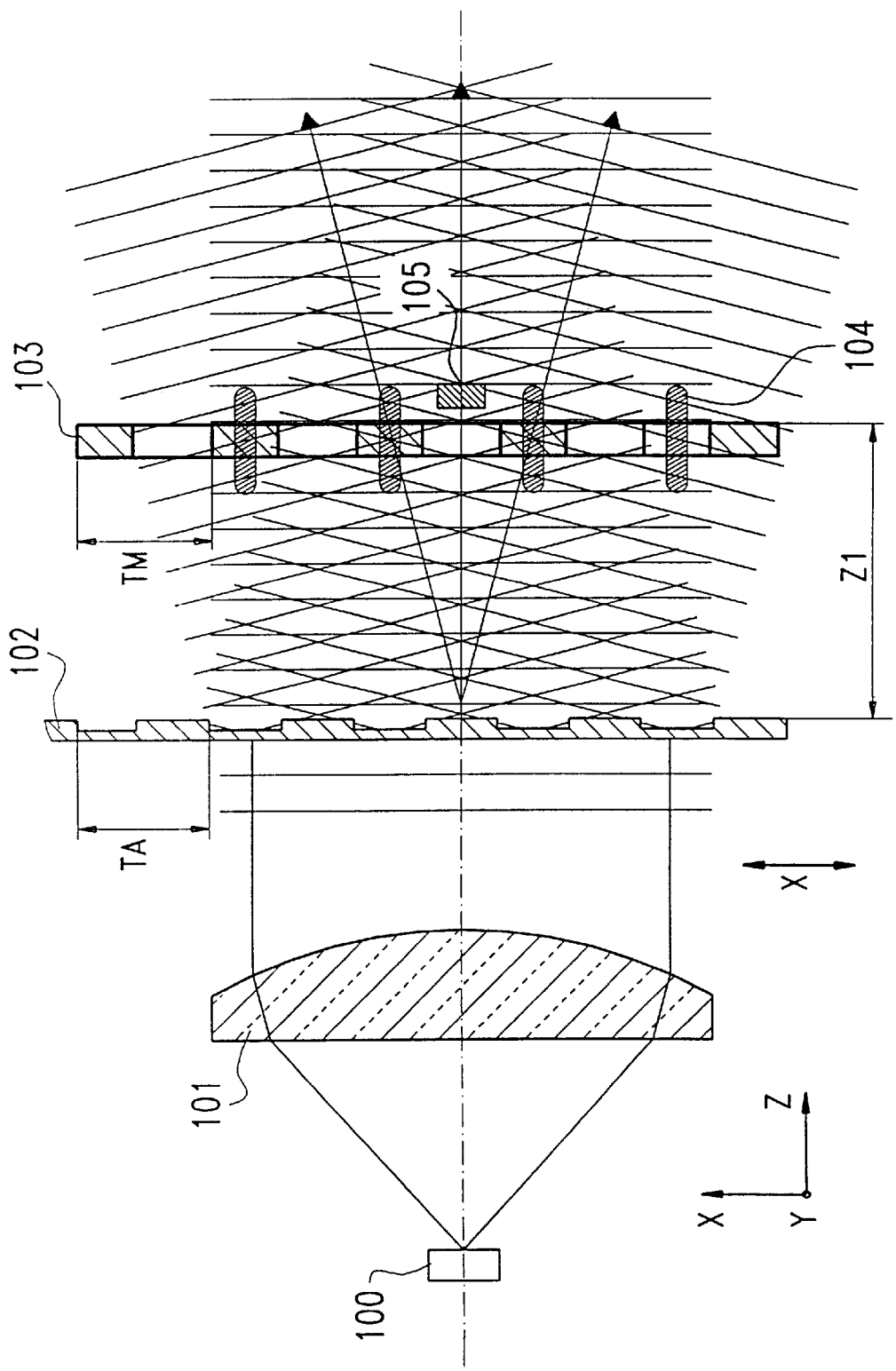
FIG. 20 is a cross-sectional view of a position measuring system according to the prior art.

FIG. 20 is a cross-sectional view of a position measuring system according to the prior art. The functional principle of the position measuring system according to the present invention will be more easily understood if the functional principle of a known position measuring system such as that shown in FIG. 20 is first examined and briefly described. The position measuring system includes a light source 100, a collimating lens 101, phase grating 102, amplitude grating 103, and photodetector 105. The light from light source 100 is collimated by collimating lens 101 and impinges on phase grating 102. Phase grating 102 has a graduation period TA. The phase grating 102 has approximately equal strip and groove widths and a phase deviation of 90°. In this case the phase deviation of 90° means that the strip height, taking the diffraction index into consideration, is such that immediately after passing through the phase grating 102, i.e. in the near field, a collimated light beam has a wave front with a local phase shift of 90° ($\lambda/4$) of the strip areas with respect to the gap areas. By means of the effect of this phase grating 102, interference strips 104 of the period TA are generated at distances Z1 where $Z1=(n+\frac{1}{2})TA^2/\lambda$ where n=0, 1, 2 . . . ; $\lambda$=light wave length, $TA^2/\lambda$=talbot distance. A further grating 103 with an amplitude graduation of the graduation period TM where TM=TA is located at one of these distances Z1. Depending on the position of the two gratings 102, 103 with respect to each other in the measuring direction X, and of the grating 103 with respect to the reference strips 104, the transmitted light output is different and is detected by a photo-detector 105. With a displacement of the two gratings 102 and 103 with respect to each other in the measuring direction X, the photo-detector 105 provides a periodic scanning signal.

Figure 1:
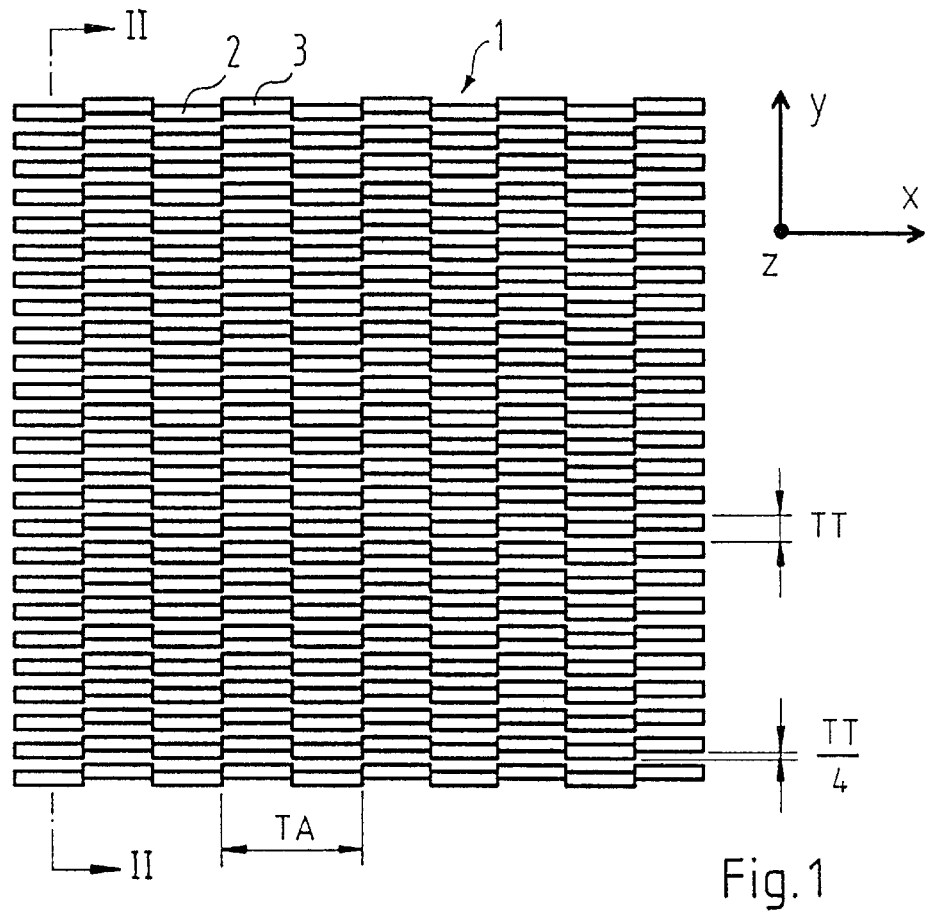
FIG. 1 is a front view of a scanning grating in accordance with a preferred embodiment of the present invention.
Figure 3:
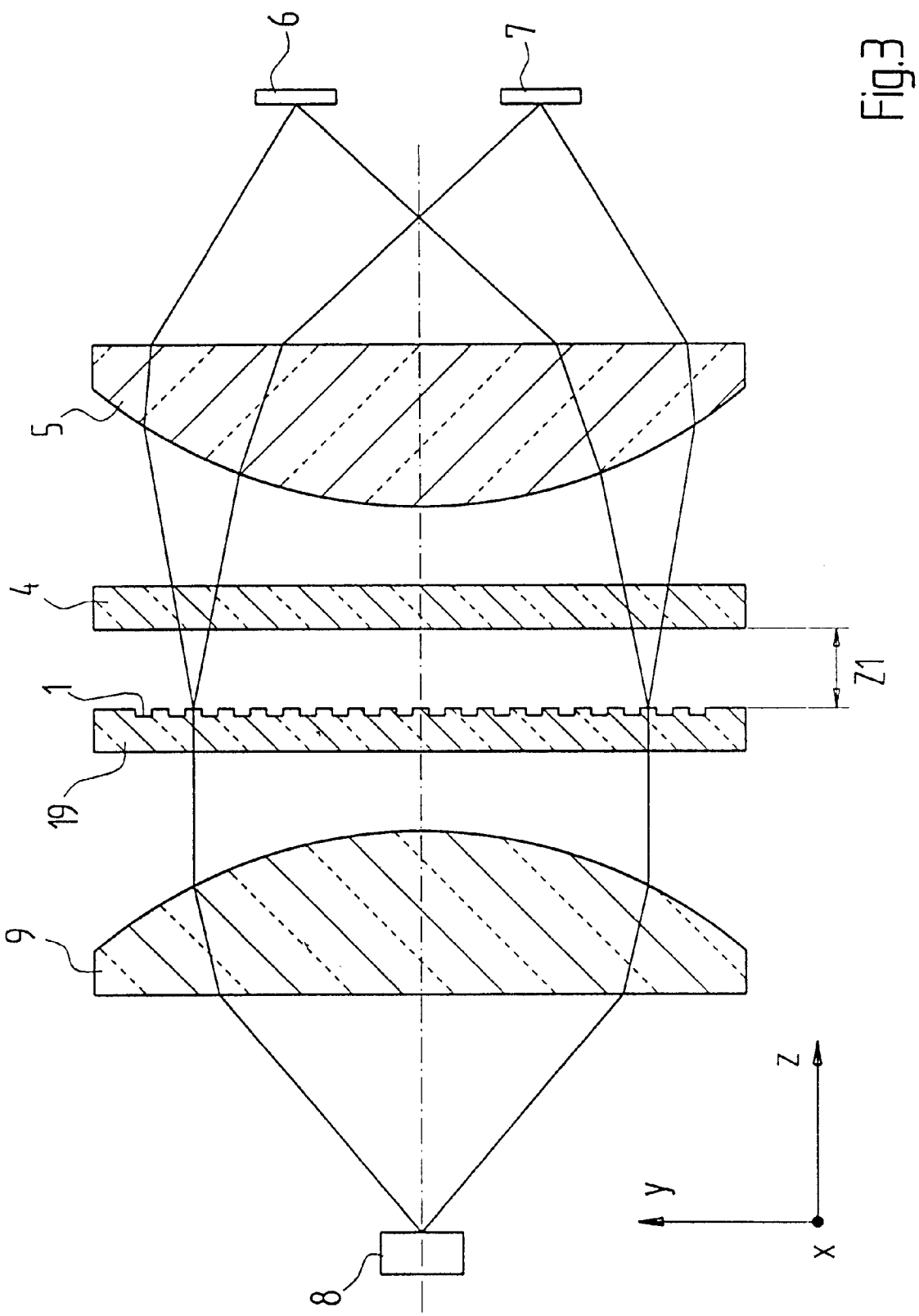
FIG. 3 is a cross-sectional schematic of a position measuring system with the scanning grating shown in FIGS. 1 and 2.

In the present invention, the first grating 102 is embodied as a scanning grating with a special transverse graduation to generate several position-dependent scanning signals which are phase-shifted with respect to each other. FIG. 1 is a front view of a scanning grating 1 according to a first preferred embodiment of the present invention. The scanning grating 1 consists of a periodic joining in the measuring direction X of transversely structured first and second grating areas 2 and 3 respectively. Viewed in the measuring direction X, these grating areas 2 and 3 are at least of even width. The combined width of a first and a second grating area 2, 3 forms the graduation period TA and is identical with the graduation period TM of the scale grating 4 which is shown in FIG. 3 and will be described hereinafter.

The first and second grating areas 2, 3 consist of transverse gratings with the same transverse graduation period TT, viewed in the Y direction. These grating strips or markings of the transverse grating areas 2, 3 are displaced with respect to each other in the Y direction by a quarter of the transverse graduation period TT. Both grating areas 2, 3 are furthermore embodied as phase gratings whose strips and gaps are of such size that preferably the even-numbered transverse diffraction orders (0-th, ±2, ±4, . . . ) are suppressed. For this purpose the transverse strip and gap elements have approximately the same width (in the Y direction) and the strips have a phase height of 180° ($\lambda/2$). If a collimated light beam impinges on this scanning grating 1, each transversely structured grating area 2, 3 essentially splits the incident light beam into a +1st and a −1st transverse diffraction order.

Because of the uniform transverse graduation period TT of both grating areas 2, 3, like transverse diffraction orders of both grating areas 2, 3 have the same deflection angle in the Y direction. Two partial light beams which are phase-shifted with respect to each other in the near field, i.e. directly at the scanning grating 1, are created in each diffraction order by the offset of the grating strips of both grating areas 2, 3 in the Y direction. This phase shift of the partial light beams is shown in FIG. 2.

Figure 2:
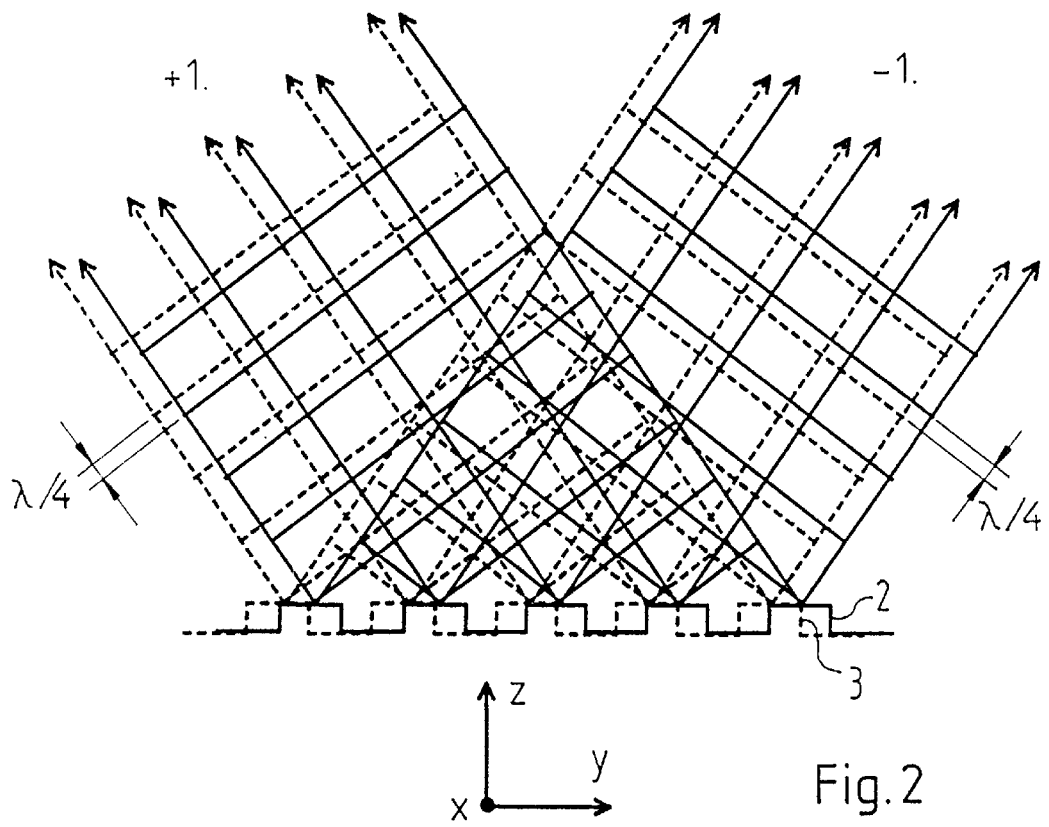
FIG. 2 is a cross-sectional view of the scanning grating shown in FIG. 1 taken along line II—II and illustrates the resultant beam path generated.

FIG. 2 is a cross-sectional view of the scanning grating shown in FIG. 1 taken along line II—II and illustrates the resultant beam path generated. Grating 2 is shown in solid line and grating 3 is shown is dashed line. A light beam impinging on the first grating area 2 is split into the +1st and −1st diffraction order, the partial light beams being generated are shown in solid lines. A light beam impinging on the second grating area 3 is also split in the +1st and −1st diffraction orders, the partial light beams are shown in dashed lines. The phase shift of the partial light beams of both areas 2, 3 in the +1st transverse diffraction order is +90° ($\lambda/4$), and in the −1st transverse diffraction order it is −90° ($-\lambda/4$). These local phase shifts should be compared with the local phase shift of the prior art position measuring system shown in FIG. 20. The local effect of the scanning grating 1 according to the present invention is therefore similar to that of a conventional phase scanning graduation, if only one of the two respective transverse diffraction orders (+1st or −1st) is considered individually and the transverse deflection of the partial light beams is disregarded. With a phase shift of +90° of the area 2 with respect to the area 3, the area 3 furthermore corresponds to the strip of a conventional phase scanning graduation. In contrast thereto, with a phase shift of −90° the area 2 corresponds to a gap of a conventional phase scanning graduation. Thus the effect of the graduation according to the present invention in +1st and −1st transverse diffraction orders are those of a conventional scanning graduation, but displaced by half a graduation period (180°).

FIG. 3 is a cross-sectional schematic of a position measuring system with the scanning grating shown in FIGS. 1 and 2. The position measuring system includes a light source 8, a lens 9, a scanning grating 1 on a scanning plate 19, a grating 4, a lens 5 and detectors 6 and 7. If such a scanning grating 1 is illuminated with collimated light, two interference strip systems are essentially created approximately at the known distances Z1 where $Z1=(n+\frac{1}{2})TA^2/\lambda$, one starting from the +1st transverse diffraction order and one starting from the −1st transverse diffraction order. However, for the reasons pointed out above, both interference strip systems are phase shifted by 180° with respect to each other so that the interference strip maxima of the one interference strip system coincide with the minima of the other. If scale grating 4, in the form of an amplitude graduation, is located at one of the distances Z1, the intensity of the transmitted light of the +1st and of the −1st transverse diffraction order is modulated in phase opposition in the course of a relative displacement of both gratings 1 and 4. The +1st and −1st transverse diffraction orders are guided by lens 5 to separate photo-detectors 6, 7 so that the latter provide signals which are correspondingly phase-shifted with respect to each other.

More particularly, the light from light source 8, preferably an LED or a semiconductor laser diode, is collimated by first lens 9 and reaches the scanning grating 1. The transmitted light beams impinge on the scale grating 4 located at a distance Z1 where $Z1=(n+½)TA^2/\lambda$, preferably with n=0. Because a spatially extended light source 8 is preferably used, somewhat shorter distances are preferably selected because the contrast of the interference strip systems, and thus the degree of modulation of the scanning signals, falls off toward greater scanning distances because of the divergence of the light source 8 and the collimating lens 9. With noticeable transverse deflection angles, the optimal scanning distance is also reduced because of small transverse graduation periods TT of the scanning grating 1.

The scale grating 4 is an amplitude grating with transparent and non-transparent strips arranged sequentially in the measuring direction X. The side edges of the strips extend in the Y direction (see FIG. 10 for an exploded view of a portion of scale grating 4). The light beams transmitted from the scale grating 4 are focused by means of lens 5 on the photo-detectors 6, 7 which are arranged spaced apart from each other in the Y direction, i.e. perpendicularly to the measuring direction X. The +1st transverse diffraction orders of the two grating areas 2, 3 of the scanning grating 1 impinge on the photo-detector 6, and the −1st transverse diffraction orders of the two grating areas 2, 3 of the scanning grating 1 impinge on the photo-detector 7. Thus the photo-detectors 6, 7 provide two signals which are phase-shifted by 180° with respect to each other. An image, which as a rule is very small, of the light source 8 is generated on the photo-detectors 6, 7 through the effect of the. lenses 5, 9. Thus, in spite of large scanning areas on the scale grating 4, it is possible to utilize very small, and therefore fast, photo-detectors 6, 7. The two scanning signals created in this way are derived from a common scanning area of the scanning grating 1 and of the scale grating 4, so that it is possible by means of the invention to gain the advantages of single field scanning.

In the example described so far, each graduation period TA of the scanning grating 1 has two grating areas 2 and 3 in the measuring direction X, which have a transverse phase shift deviating from 0° and 180°. However, in accordance with the invention every graduation period TA can be divided into several grating areas with respectively arbitrary phase shifts. It is important in this connection that for generating the scanning signals which are phase-shifted with respect to each other, several grating areas are involved which have transverse phase shifts deviating from 0° and 180°.

Figure 4:
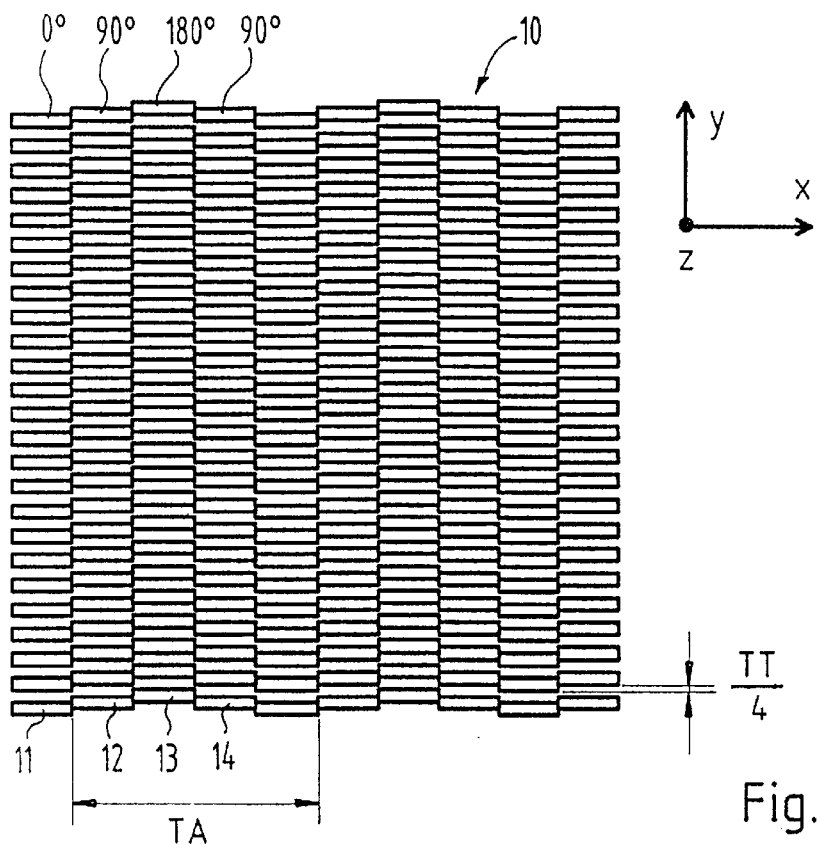
FIG. 4 is front view of a scanning grating according to a second preferred embodiment of the present invention.

FIG. 4 is a front view of a scanning grating according to a second preferred embodiment of the present invention. The scanning grating 10 has four areas 11, 12, 13, 14 of approximately the same width per graduation period TA. Each area 11, 12, 13, 14 has a transverse graduation with grating strips or markings of the same graduation period TT and extending in the measuring direction X. The grating strips of the second area 12 are disposed phase-shifted by 90° with respect to the grating strips of the first area 11, the grating strips of the third area 13 are again phase-shifted by 90° with respect to the grating strips of the second area 12, and the grating strips of the fourth area 14 are equi-phased with the grating strips of the second area 12. This results in phase positions of 0°, 90°, 180° and 90°.

If such a scanning grating 10 is employed in a position measuring system in accordance with FIG. 3, the optimal scanning distance is approximately Z1 where $Z1=(n+¼)TA^2/\lambda$, in which two signals, phase-shifted by 180° with respect to each other, of the +1st and −1st transverse diffraction order are generated by the photo-detectors 6, 7. This reduced scanning distance Z1 is particularly advantageous if the modulation degree in a larger scanning distance Z1 would be reduced too much because of the divergence of the illuminating unit of the light source 8 and lens 9.

Figure 5:
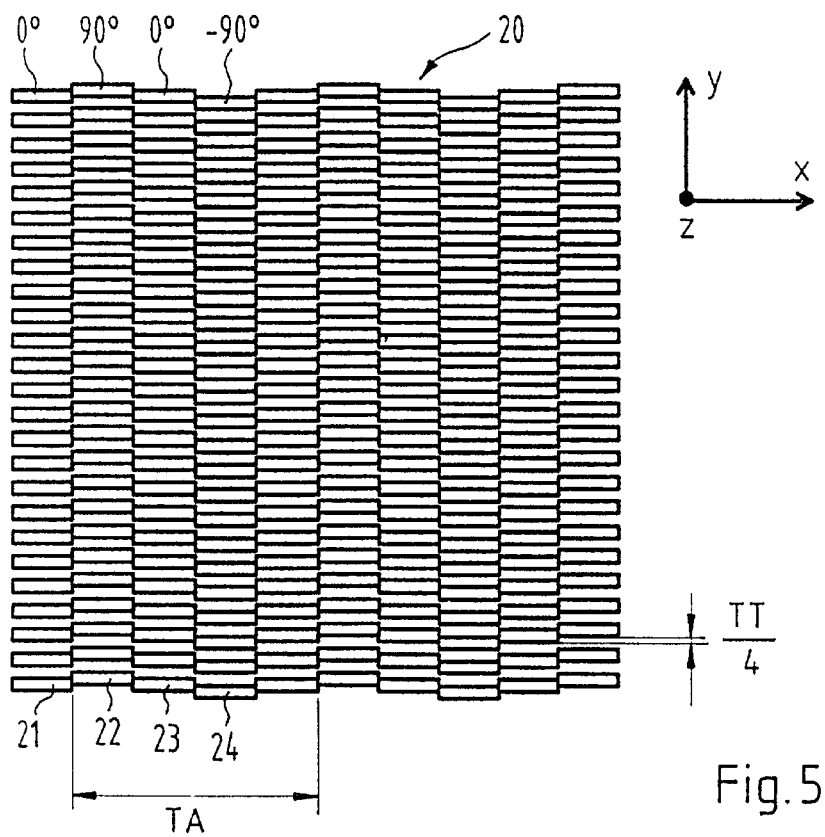
FIG. 5 is a front view of a scanning grating according to a third preferred embodiment of the present invention.

For defined applications it may also be advantageous to obtain a larger scanning distance Z1, for example for reducing the harmonic wave content of the scanning signals by means of the increased effect of the divergence of the illuminating unit 8, 9. FIG. 5 is a front view of a scanning grating according to a third preferred embodiment of the present invention. The scanning grating 20 is suitable for reducing the harmonic wave content of the scanning signals. The scanning grating 20 again consists of a grating with a graduation period TA in the measuring direction X having four transverse grating areas 21 to 24. The markings or grating strips of the transverse grating areas 21 to 24 are arranged phase-shifted with respect to each other in such a way that the phase positions of 0°, 90°, 0° and −90° result. The optimal scanning distance Z1 is equal to $(n+¾)TA^2/\lambda$ in this case.

Figure 6:
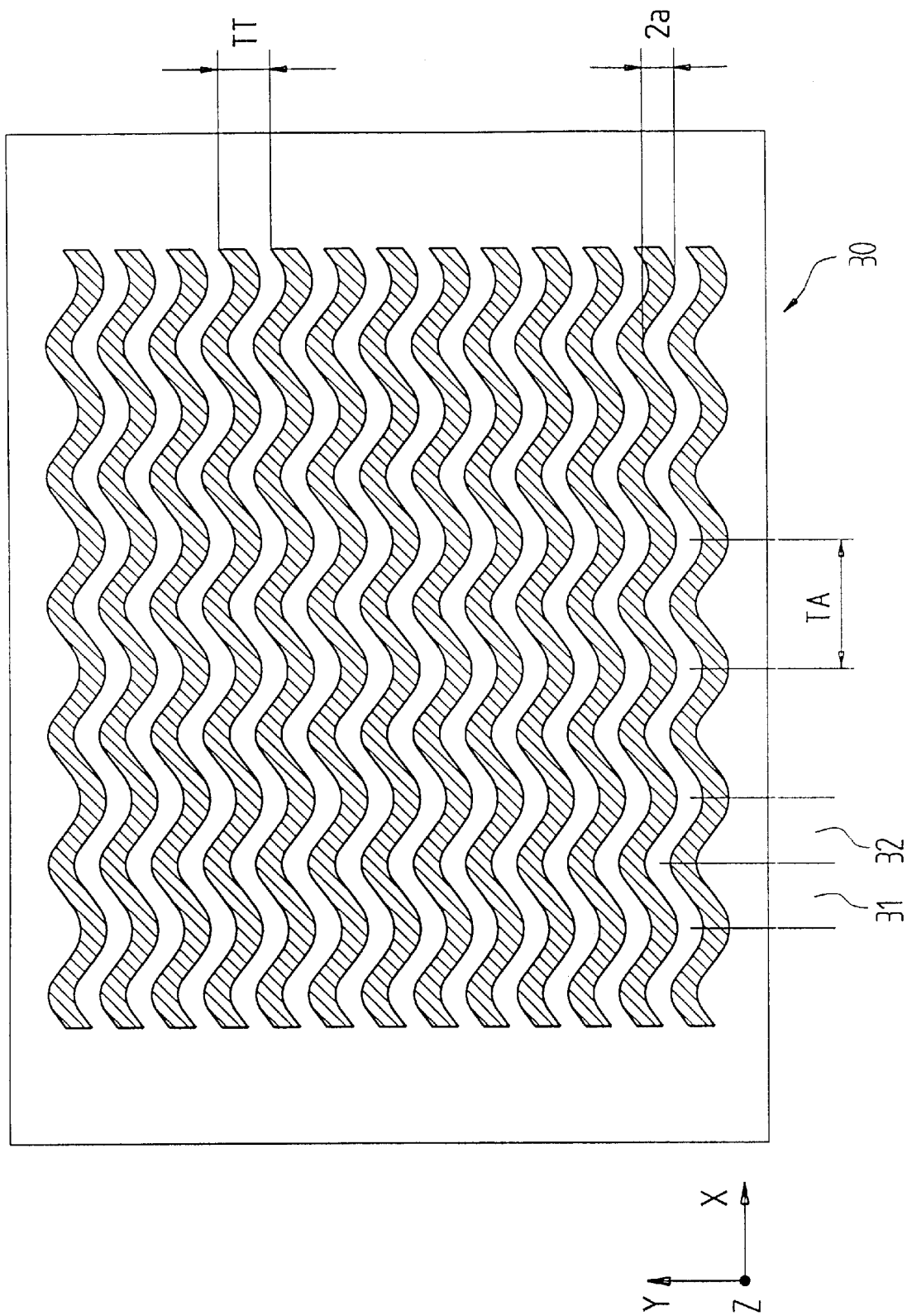
FIG. 6 is a front view of a scanning grating according to a fourth embodiment of the present invention.

FIG. 6 is a front view of a scanning grating according to a fourth preferred embodiment of the present invention. The scanning grating 30 has a continuous course of the phase shift beyond a longitudinal graduation period TA, i.e. in the measuring direction X. Defined properties of the position measuring system can be optimized by this continuous course of the markings of both transverse grating areas 31 and 32. The harmonic wave content of the scanning signals can be reduced in this way, or the optimal scanning distance can be set to a predetermined value Z1 where $Z1=(n+C)TA^2/\lambda$, where C is any value. In particular, with the sinusoidal course selected in FIG. 6 it is possible to greatly reduce the third harmonic. In this case the amplitude a of the transverse strip displacement is the result of solving following equation:

$$a/TT = X3/(4\pi \sin(3\pi \cdot Z1 \cdot \lambda/TA^2)),$$

where X3=zero point of the Bessel function J3(X3)=0 and Delta Y=a·sin(2πX/TA) local transverse strip displacement where Delta Y is the instantaneous amplitude as a function of the instantaneous value X and the symbol · represents the multiplication operation.

A scanning distance Z1 where $Z1=(n+½)TA^2/\lambda$ is particularly advantageous in this case since the fundamental wave assumes a large value. On the other hand a maximal modulation degree of the scanning signals is obtained at a given scanning distance Z1 for a/TT=X1 max/(4π sin(n·Z1·λ/TA²)) with the maximum X1 max of the Bessel function J1. In this case the expansion of the light source must be taken into consideration and results in somewhat smaller scanning distances Z1.

Figure 7:
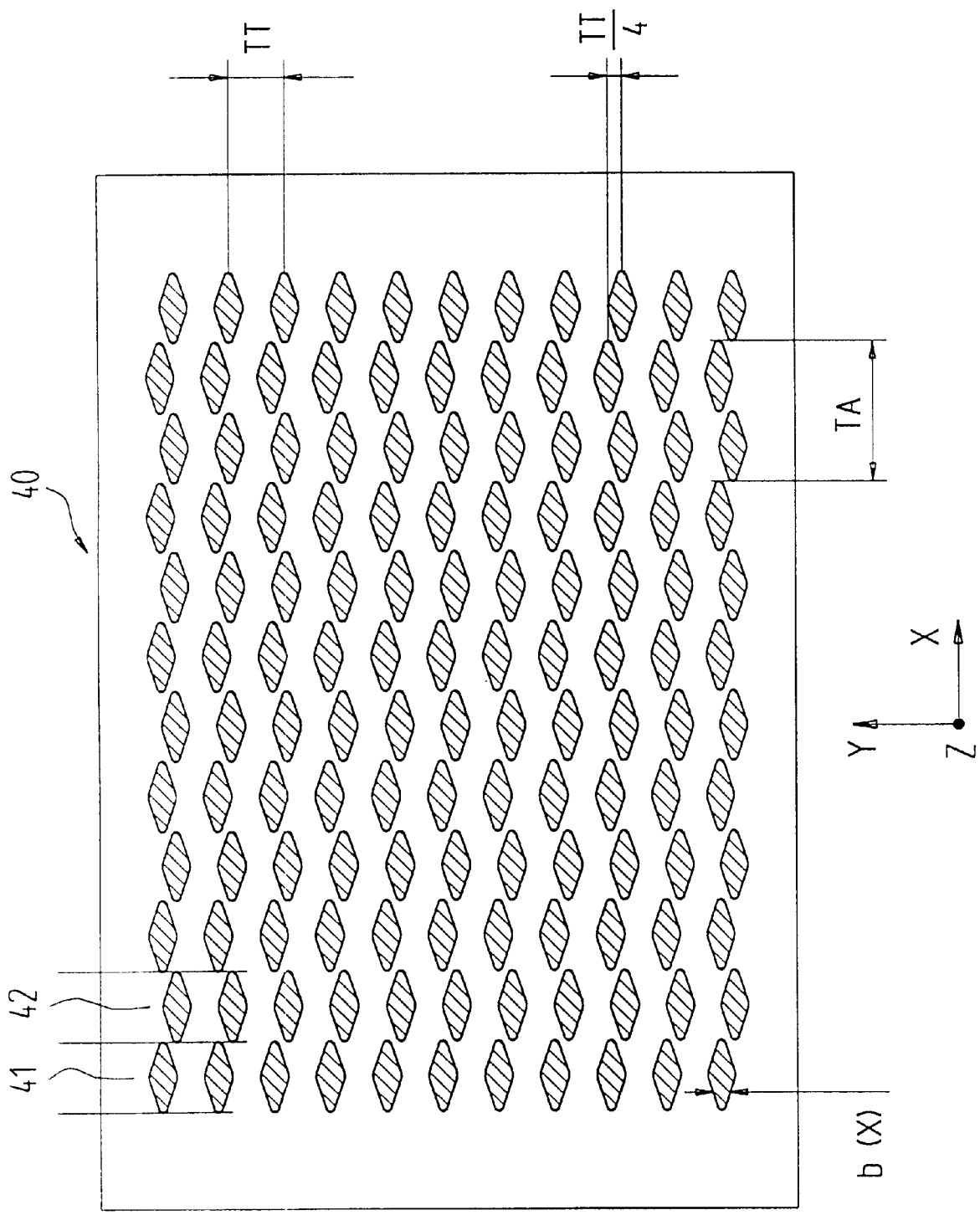
FIG. 7 is a front view of a scanning grating according to a fifth embodiment of the present invention for filtering harmonic waves.

FIG. 7 is a front view of a scanning grating according to a fifth preferred embodiment of the present invention for filtering harmonic waves. The scanning grating shown in FIG. 7 has transverse markings, or grating strips of different widths, b, along the measuring direction X. Thus the diffraction efficiency in the individual diffraction orders ±1, ±2, . . . of transverse diffraction order depends on the location X along the measuring direction X. These transverse diffraction orders considered in the near field correspond to the effect of a combination of conventional phase and amplitude graduations, since both the phase and the amplitude of the partial light beams are modulated in the near field. The width b in the Y direction of the individual markings varies and if it is selected, for example in accordance with the equation:

$$\sin(\pi b(x)/TT) = \sqrt{\sin(2\pi X/TA)}$$

the scanning signals are free of harmonics at approximately the following distance Z1 where $Z1=(n+\frac{1}{2})TA^2/\lambda$.

This scanning grating 40, consisting of two grating areas 41, 42 phase-shifted by TT/4 with respect to each other, wherein the width b(x) of the markings, strip or gap, varies in accordance with the above equation.

Figure 8:
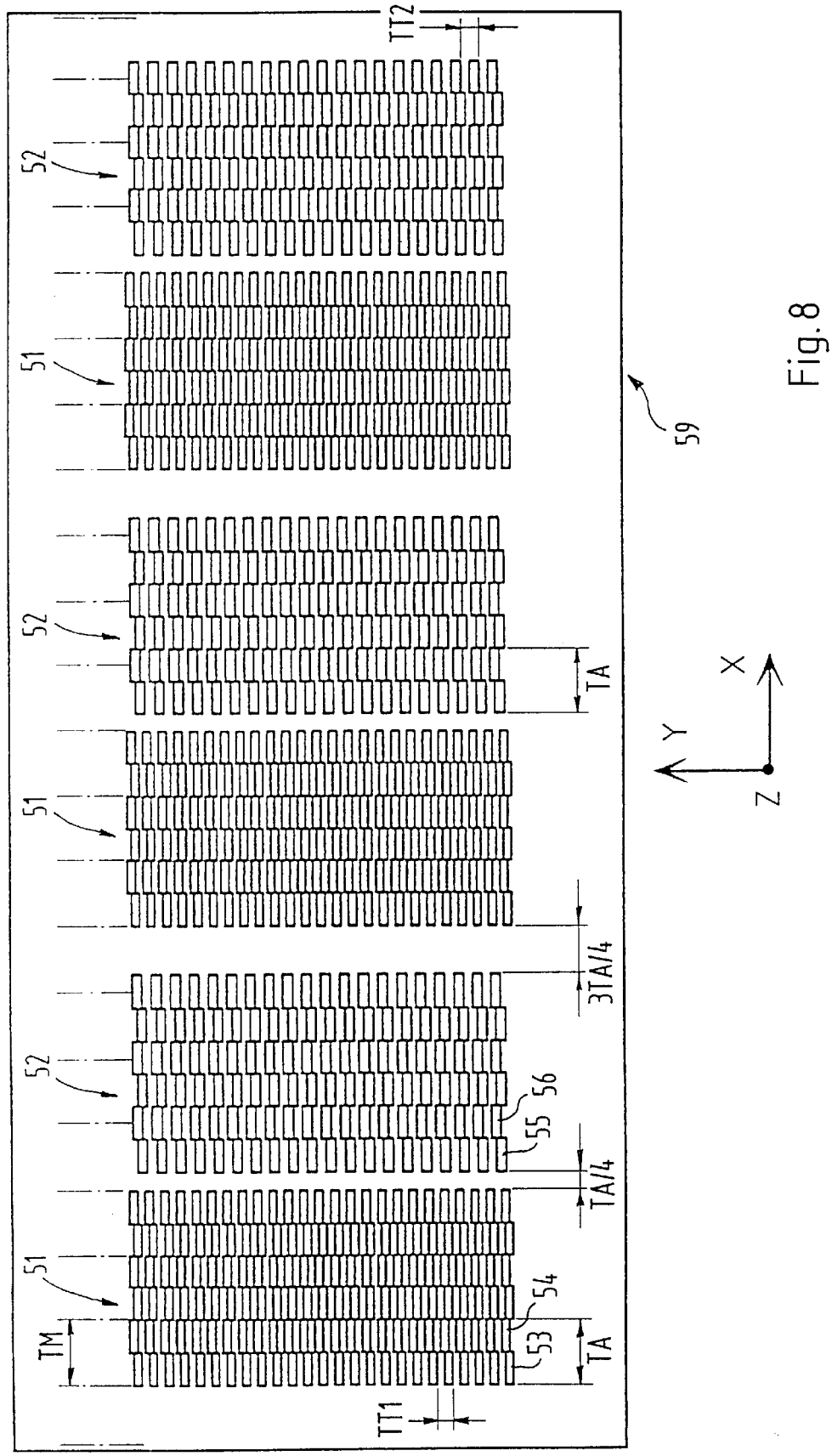
FIG. 8 is a front view of a scanning grating according to a sixth embodiment of the present invention for generating four scanning signals.

FIG. 8 is a front view of a scanning grating according to a sixth preferred embodiment of the present invention for generating four scanning signals. The scanning plate 59 has two groups of scanning gratings 51, 52, which are arranged interleaved with each other in the measuring direction X. Each group consists of three scanning gratings of the same kind. The scanning gratings 51 or 52 of one group are arranged offset from each other by a multiple of the longitudinal graduation period TA. Each scanning grating 51, 52 in turn consists of three longitudinal graduation periods TA. The scanning gratings 51, 52 of the two groups differ by the transverse graduation periods TT1 and TT2, which have values preferably of about 5 μm and about 7 μm respectively, for example. The scanning gratings 52 of the second group are disposed spaced apart in the measuring direction X by (m+1/4)TA with respect to the scanning gratings 51 of the first group, wherein m=1, 2 . . . By means of this geometric offset, the intensity modulations of the +1st transverse diffraction order of the scanning gratings 52 of the second group are phase-shifted by respectively 90° with respect to those of the first group. In this way four scanning signals phase-shifted by respectively 90° with respect to each other are obtained by separate detection of respectively the +1st and −1st diffraction orders of both groups. It is of course possible for each group to consist of more than three scanning gratings 51, 52, and each scanning grating 51, 52 of more than three graduation periods TA.

Figure 9:
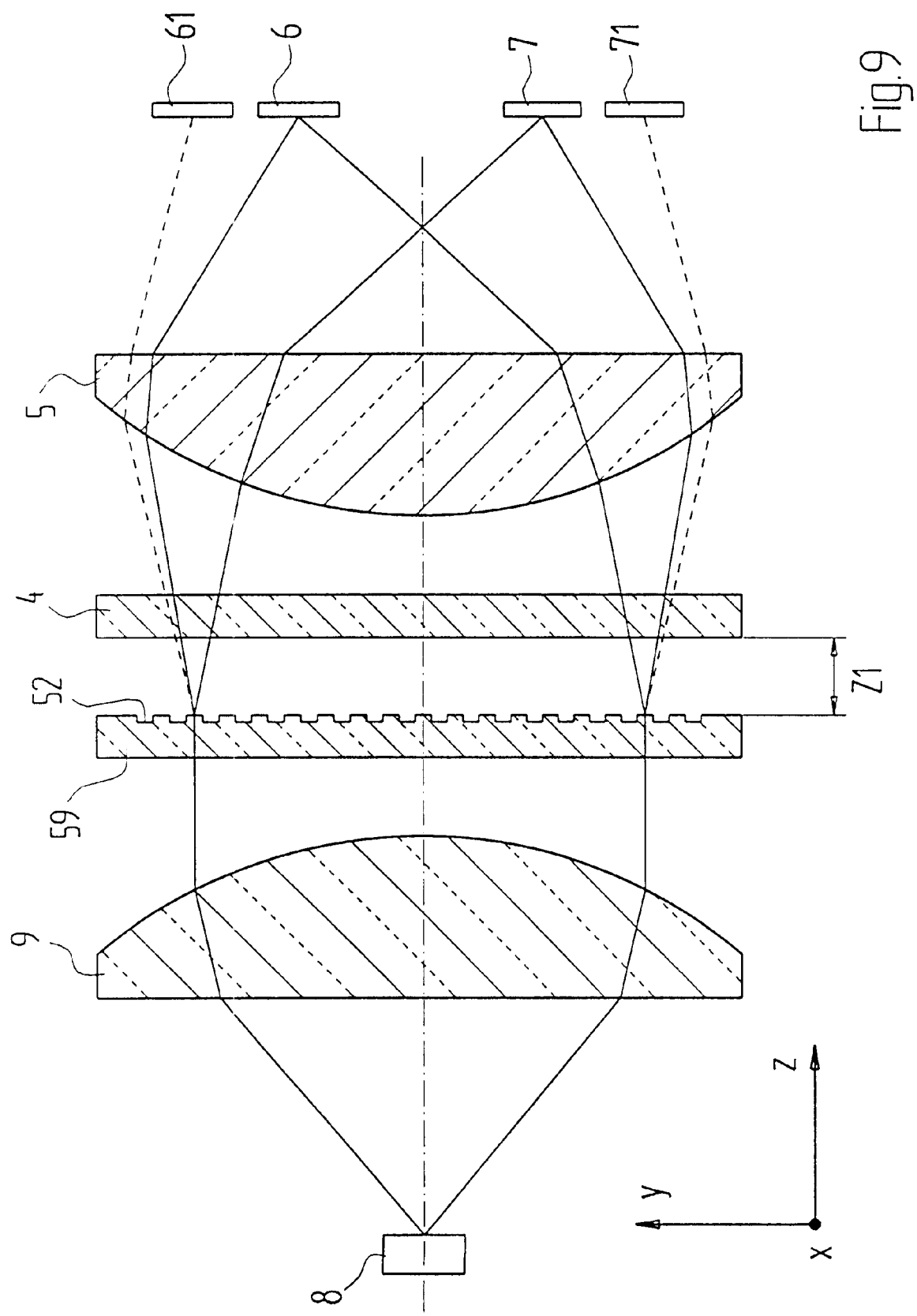
FIG. 9 is a cross-sectional schematic of a position measuring system with the scanning grating shown in FIG. 8.

FIG. 9 is a cross-sectional schematic of a position measuring system with the scanning grating shown in FIG. 8. The position measuring system includes a light source 8, a lens 9, a scanning plate 59 with scanning gratings 51 and 52 disposed thereon, a scale plate 4, a lens 5 and detectors 6, 7, 61, and 71. The light from light source 8 is collimated by the lens 9 and reaches the scanning plate 59. The partial light beams of the ±1st diffraction order of the scanning gratings 51, 52 of both groups impinge on the scale grating 4 at the known scanning distance Z1, and the transmitted partial light beams are focused on four photo-detectors 6, 7 and 61, 71 by the further lens 5. The four photo-detectors 6, 7, 61, 71 are disposed above each other in the Y direction. The light beams are deflected by the scanning grating 51 in a different way from that of the scanning grating 52 by means of the different transverse graduation periods TT1 and TT2 and are in this way focused by the second lens on different photo-detectors 6, 7; 61, 71. The light beams which are deflected by the scanning gratings 51 into the +1st diffraction order impinge on the photo-detector 61, those deflected by the scanning gratings 51 into the −1st diffraction order impinge on the photo-detector 71. The light beams which are deflected by the scanning gratings 52 into the +1st diffraction order impinge on the photo-detector 6, those deflected by the scanning gratings 52 into the −1st diffraction order impinge on the photo-detector 7. Each of the scanning gratings 51, 52 can be embodied in accordance with the already described embodiments of FIGS. 1 to 7 or in a combination of these.

Figure 10:
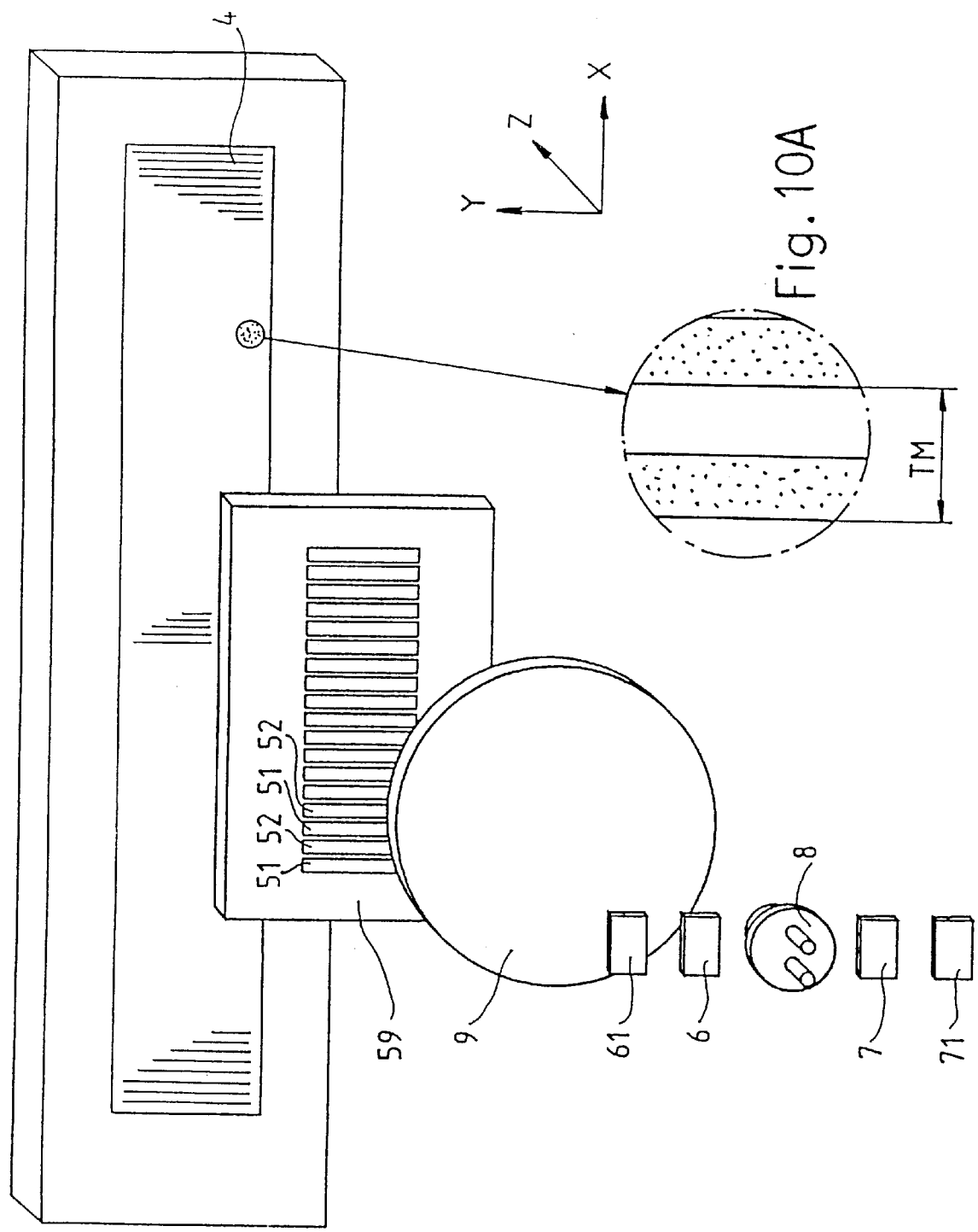
FIG. 10 illustrates a position measuring system with the scanning grating shown in FIG. 8 in a spatial representation.

FIG. 10 illustrates a position measuring system with the scanning grating shown in FIG. 8 in a spatial representation. So far the two position measuring systems described operate in accordance with the transmitted light method. However, the present invention can also be realized with the so-called incident light method-as shown in FIG. 10. The result is a particularly simple structure with only one lens 9 which also takes over the function of lens 5. The scanning plate 59 is embodied in accordance with FIG. 8. Since the scale grating 4 is made to be reflecting, light passes twice through the scanning plate 59 so that the partial light beams deflected in the +1st and −1st transverse diffraction order during the first passage are again transversely deflected in the +1st and −1st diffraction order in the second passage and exit in the resultant +2nd and −2nd transverse diffraction order (relative to the direction). The four photo-detectors 6, 7, 61, 71 are disposed in or near the focal plane of the lens 9 so that they detect these ±2nd resultant transverse diffraction orders of the two groups of scanning gratings 51, 52.

During the first passage through the scanning gratings 51, 52 the partial light beams are deflected in the Y direction and therefore again reach the scanning gratings 51, 52 offset in the Y direction following reflection at the scale grating 4. The field limits of the individual scanning gratings 51, 52 trim the partial light beam during the second passage. This shading is different for both scanning gratings 51, 52 at a given scanning distance Z1 because of the different transverse graduation periods TT1, TT2. This shading effect can be compensated by appropriately different dimensions of the scanning gratings 51, 52 in the Y direction.

The partial light beams exiting during the second passage through the scanning plate 59 in the ±2nd resultant transverse diffraction order are superimpositions of different light beams which are differently transversely deflected in the two passages. Thus, a partial light beam deflected in the first passage in +3rd and in the second passage in −1st transverse diffraction order exits in +2nd resultant transverse diffraction order and reaches the photo-detector 6 or 61. Since this partial light beam travels a path which is different in comparison to the partial light beam deflected twice in +1st transverse diffraction order, it is possible with a coherent superimposition of both partial light beams to generate a scanning signal which is strongly dependent upon the scanning distance Z1. Coherent superimposition should therefore be avoided, for example by using a chronologically and/or spatially incoherent light source, such as an LED or a longitudinal or transverse multi-mode laser, in particular a semiconductor laser diode.

Figure 11:
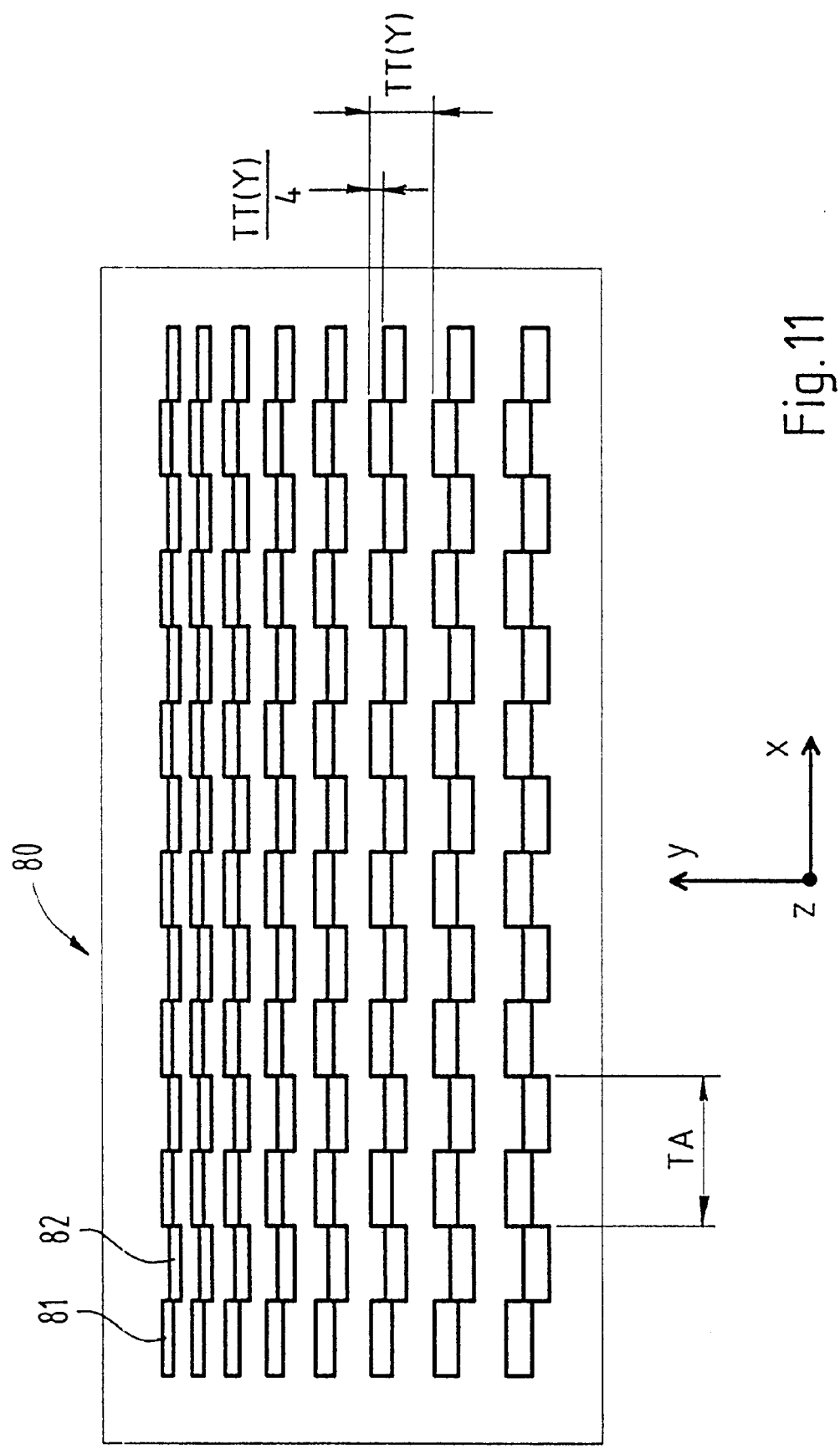
FIG. 11 is a front view of a scanning grating according to a seventh embodiment of the present invention.

Another possibility for avoiding coherent superimposition consists in embodying the grating areas 81, 82 (see FIG. 11) of a scanning grating 80 in the form of a so-called chirped grating, whose transverse graduation period TT continuously changes by a small amount as a function of the path in the Y direction. The impinging light beams are differently deflected in the Y direction because of this continuous variation of the local transverse graduation period TT(Y). These differently strongly deflected partial light beams are directed on a common photo-detector 6 or 7. The path length differences between the superimposed partial light beams which impinge on one of the photo-detectors 6, 7 are therefore position-dependent in the Y direction and are averaged, so that the coherent superimposition is destroyed. This embodiment is particularly advantageous when using a laser light source.

A particular advantage of the position measuring system represented in FIG. 10 is the position of the so-called neutral point of rotation. The neutral point of rotation is defined as the point around which the scanning device 6 to 9, 61, 71 or the scale 4 can be tilted without the scanning signals being phase-shifted with respect to their set position, so that the position measuring value determined by an electronic evaluation device remains constant. The neutral point of rotation of the position measuring system in accordance with FIG. 10 is located in the plane of the scale grating 4. Waviness of the scale surface, in particular in the measuring direction X, which corresponds to local tilting of the scale grating 4 around an axis of rotation located in the plane of the scale grating 4, therefore does not affect the determined position measuring value, which leads to considerable increases in the accuracy of the measuring system. The reason for this is that during the second passage through the scanning grating 59 the light beams are deflected in the Y direction independently of the position in the X direction. The intensity of the passing partial light beams is independent of the place where they impinge in the measuring direction X. For this purpose the photo-detectors 6, 7, 61, 71 should detect all longitudinal diffraction orders, at least all 0th and ±1st, and possibly also the ±2nd diffraction orders in addition.

Figure 12:
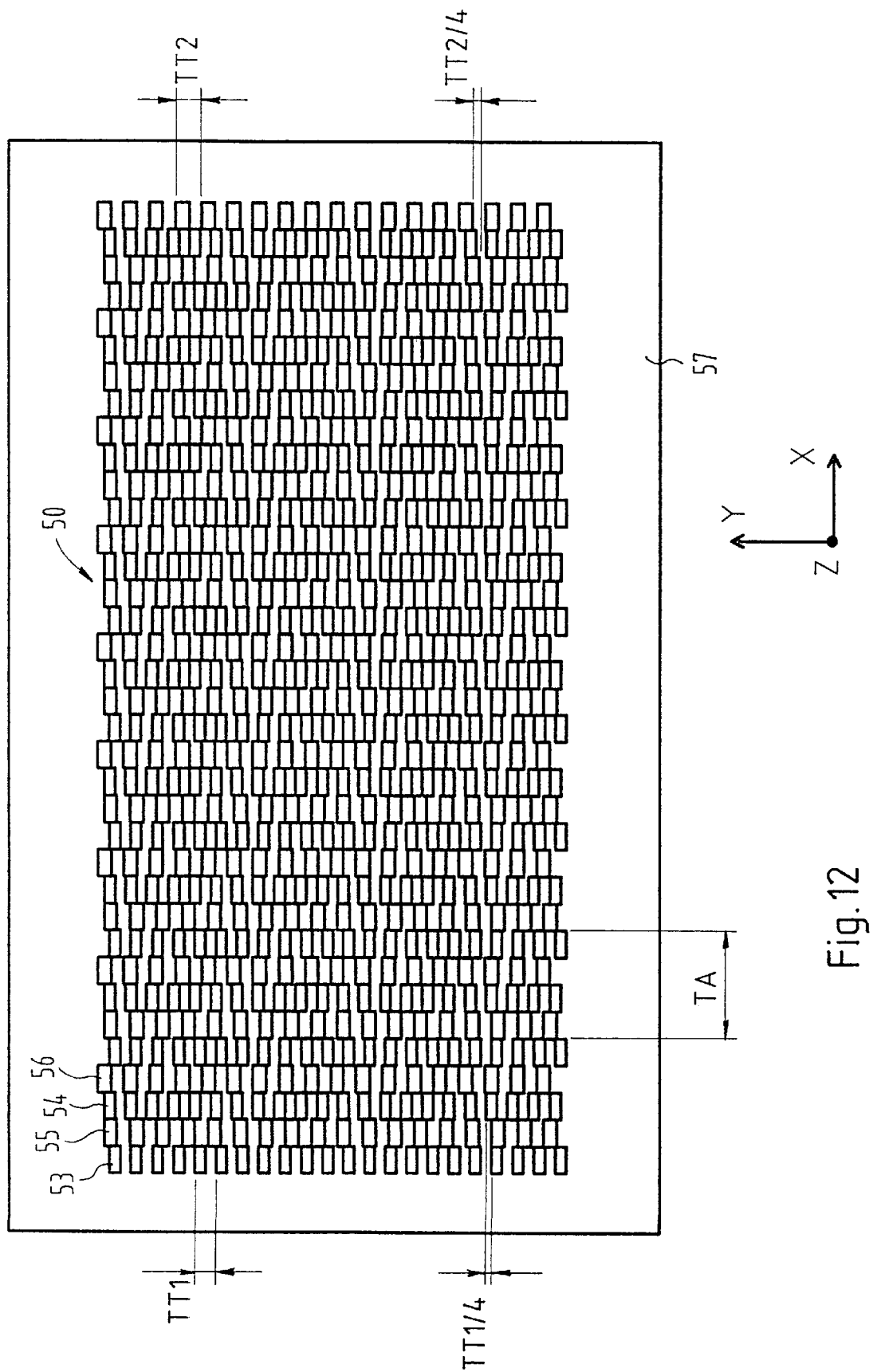
FIG. 12 is a front view of a scanning grating according to an eighth preferred embodiment of the present invention.

The scanning plate 59 in accordance with FIG. 8 can be modified in such a way that a purely single field scanning is made possible. Such a scanning plate 57 is represented in FIG. 12. In contrast to FIG. 8, the grating areas 53, 54, offset from each other by 1/4 of the transverse graduation periods TT1 of the scanning grating 51 of the transverse graduation period TT1 are not disposed directly next to each other in the measuring direction X, instead one respective grating area 55, 56 of the further scanning grid 52 with the transverse graduation period TT2 is disposed between them. Each graduation period TA of the scanning grating 50 created in this manner consists of four equally wide grating areas 53 to 56. The respectively first and third grating areas 53, 54 have the same transverse graduation period TT1 of, for example about 5 μm, wherein the markings (grating strips) of the grating areas 53, 54 are phase-shifted by TT1/4, corresponding to 90° with respect to each other. They generate two first scanning signals, phase-shifted by 180° with respect to each other, in the associated first transverse diffraction orders. The second and fourth grating areas 55, 56 located between them also have a common transverse graduation period TT2 of, for example, about 7 μm which, however, is different from TT1 wherein the transverse grating strips are again phase-shifted in the Y direction by TT2/4, corresponding to 90° with respect to each other. They also generate in the associated first transverse diffraction directions two scanning signals phase-shifted by 180° with respect to each other. However, because of the geometric offset (in the measuring direction X) of 90° of the grating areas 53, 54 with respect to grating areas 55, 56, these two scanning signals are phase-shifted by 90° with respect to the first two scanning signals so that four scanning signals 0°, 90°, 180°, 270°, phase-shifted by 90° with respect to each other, are derived from a common area of the scanning plate 90 and thus also from the scale grating 4.

Figure 13:
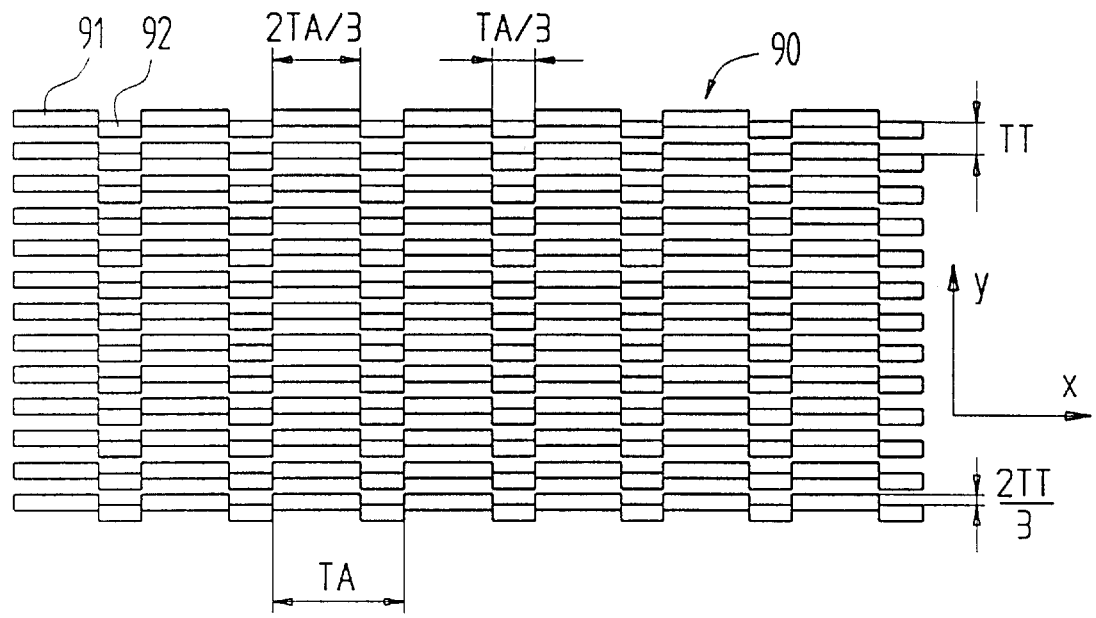
FIG. 13 is a front view of a scanning grating according to a ninth preferred embodiment of the present invention for the generation of three signals which are phase-shifted by 120° with respect to each other.

By means of the present invention its is basically possible to replace any prior art phase grating wherein the phase deviation is realized by means of strips and gaps of different height or differing refractive index alternatingly disposed in the measuring direction X, by a transverse grating with markings in several grating areas which are transversely geometrically phase-shifted with respect to each other. In this way it is also possible to realize in a particularly simple manner the scanning grating (reference grating) used in European Patent Publication No. EP 0 163 362 B1. To generate three signals, phase-shifted by 120° with respect to each other, two transverse grating areas 91, 92 with markings of the same graduation period TT, which are transversely phase-shifted by 2TT/3 (corresponding to 120°) with respect to each other, are provided in this further scanning grating 90 in accordance with the present invention, which is represented in FIG. 13. The grating areas 91, 92 can again be embodied as amplitude or as phase gratings. It is also particularly advantageous here to embody the transverse grating areas 91, 92 as phase gratings whose parameters are selected such that the 0th, ±2nd, ±4th, . . . transverse diffraction orders are suppressed.

The width of the two grating areas 91, 92 constitutes the graduation period TA. One of the grating areas 91 has a width of 2TA/3, and the other area a width of TA/3 (viewed in the measuring direction).

Figure 15:
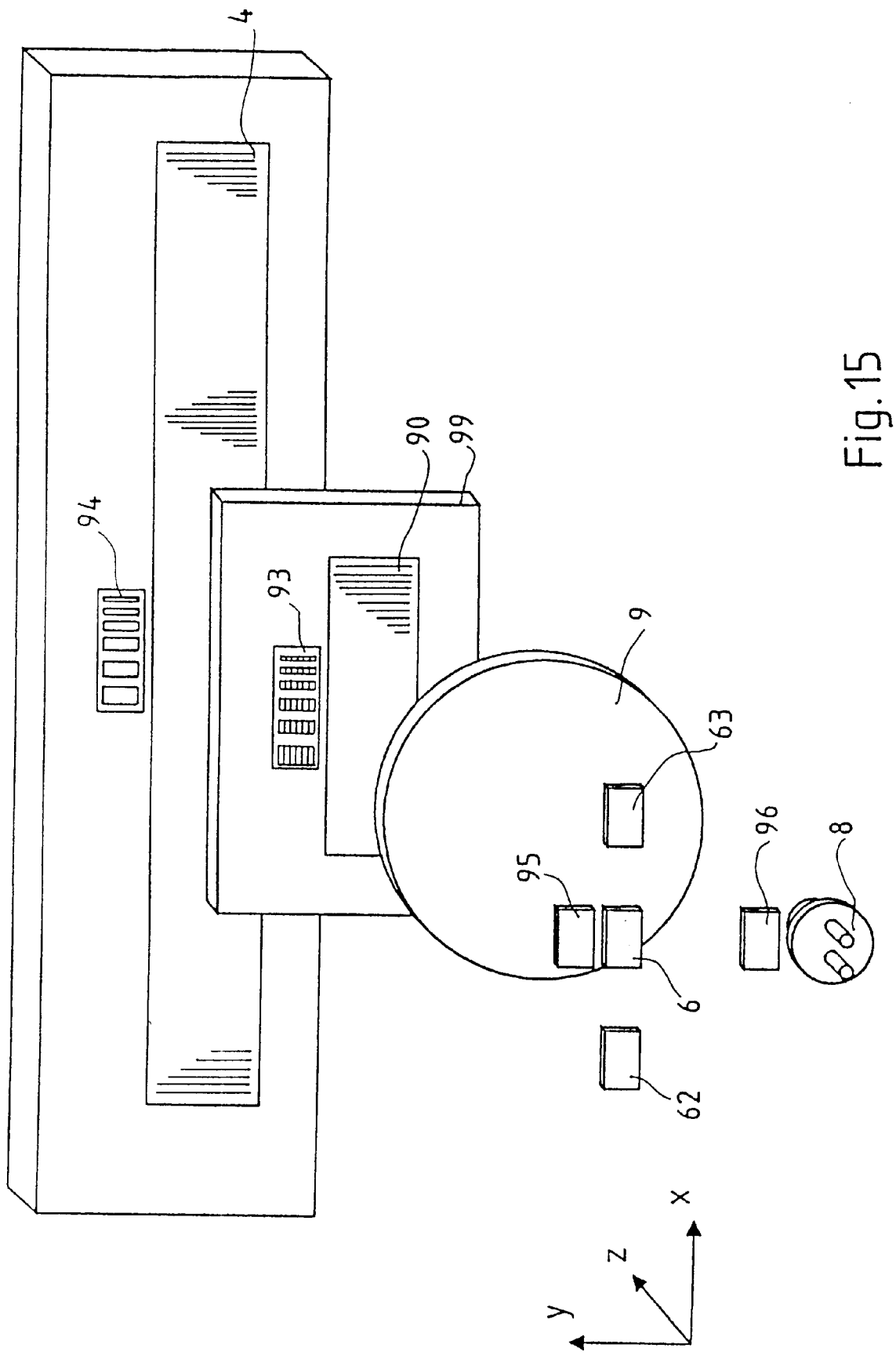
FIG. 15 illustrates a position measuring system with the scanning grating shown in FIG. 13 in a spatial representation.

A position measuring system using the scanning grating 90 shown in FIG. 13 is represented in FIG. 15. The light source 8 illuminates, via a collimating lens 9, a scanning plate 99 with the scanning grating 90. The transmitted light beams impinge on the reflecting scale grating 4 and are again directed to the scanning grating 90. Partial light beams, diffracted in the measuring direction X as well as transversely, impinge on the photo-detectors 6, 62, 63. By means of double transverse diffraction in the ±1st diffraction order, the partial beams of the ±2nd diffraction order impinge on the photo-detectors 6, 62, 63.

Figure 14:
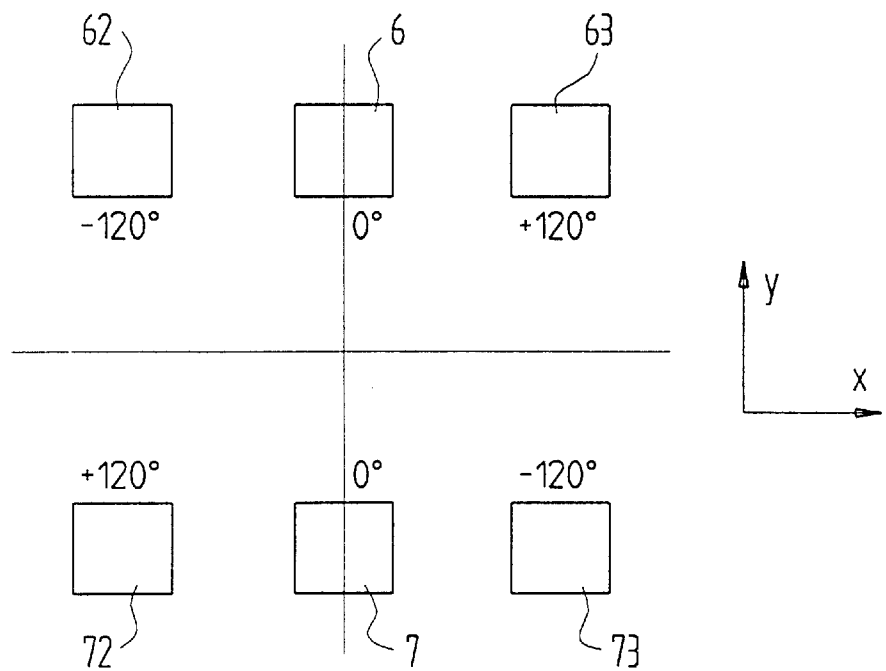
FIG. 14 illustrates an arrangement of the photo-detectors that can be used in a position measuring system with the scanning grating shown in FIG. 13.

A possible arrangement of photo-detectors 6, 62, 63 and 7, 72, 73 is represented in FIG. 14. But since the photo-detectors 7, 72, 73 generate the same signals (0°, 120°, −120°) as the photo-detectors 6, 62, 63, they are not used in the position measuring system in FIG. 15.

The employment of a transversely deflecting scanning grating 90 has the advantage that with simultaneous scanning of a reference marker 93, 94 a separation of the partial light beams can be realized by the selection of the grating parameters of the transverse grating areas 91, 92 and of the reference marking 93. No additional deflection elements in the form of prisms are required to prevent interference between the partial light beams from the reference marking 93, 94 as well as the scale and scanning gratings 4, 90. It is particularly advantageous to embody the reference markings 93, 94 in a known manner in the measuring direction X in the form of a chirped grating, in particular in accordance with FIG. 3 of the not-yet-published European Patent Application No. 95102328.2. The chirped grating strips of the reference marking 93 have a transverse graduation so that two signals, phase-shifted by 180° with respect to each other, can be generated by means of the photo-detectors 95, 96.

Figure 16:
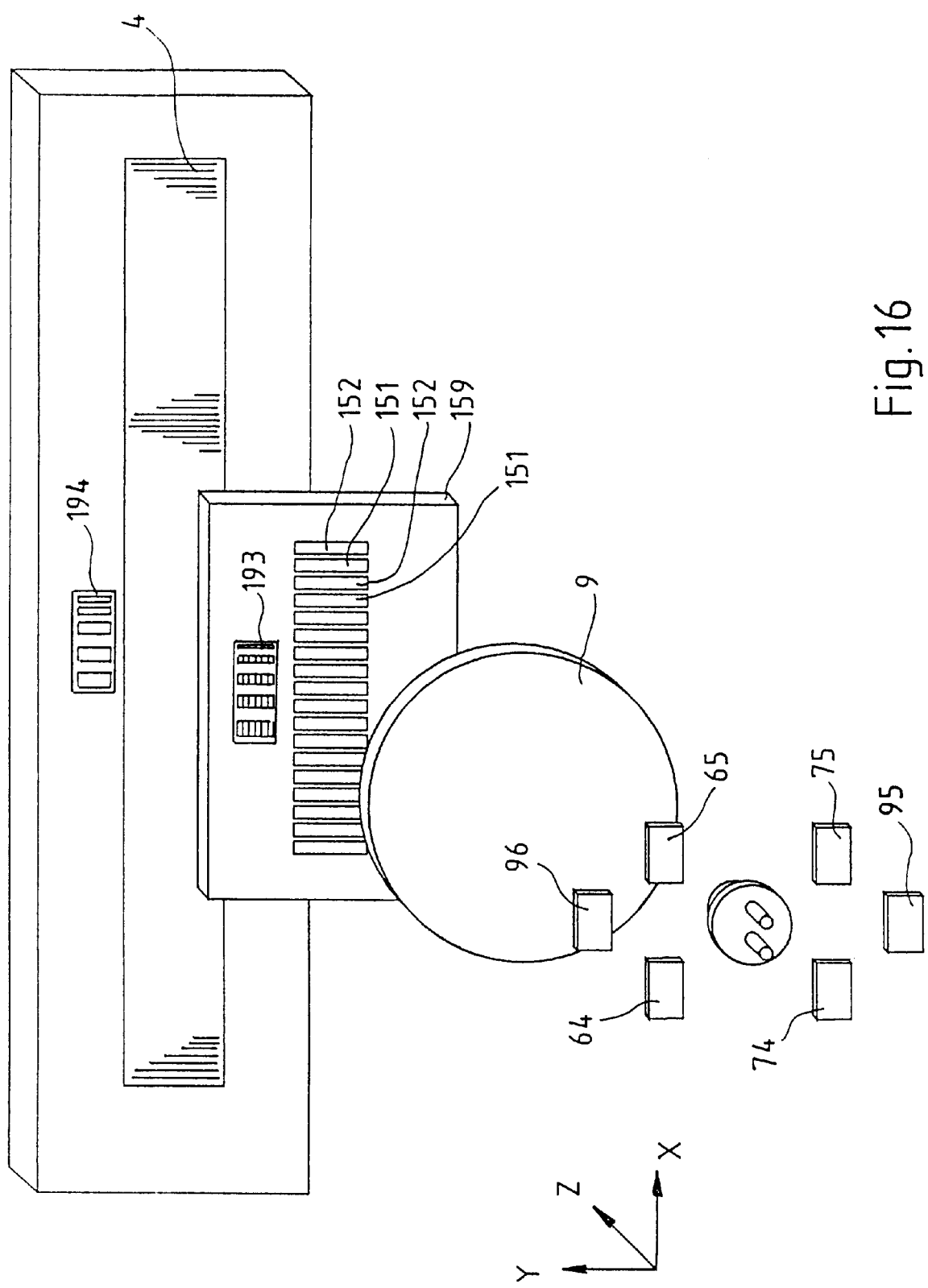
FIG. 16 illustrates a position measuring system according to another preferred embodiment of the present invention.

FIG. 16 illustrates a position measuring system according to another preferred embodiment of the present invention. Scanning gratings 151 and 152 are embodied on the scanning grating 159. Two groups of scanning gratings 151, 152 are provided for scanning the scale grating 4. Each group consists of two scanning gratings 151 or 152 of the same type. The two scanning gratings 151 or 152 of each group are disposed offset from each other by a multiple of the longitudinal graduation period TA. Each scanning grating 151, 152 in turn consists of five longitudinal graduation periods TA. In contrast to the exemplary embodiment shown in FIG. 8, the scanning gratings 151, 152 of the two groups differ not by different transverse graduation period, but by the Blaze angle φ1, as can be seen from FIGS. 18 and 19. In addition, the scanning gratings 152 of the second group are arranged spaced apart by (m+1/4)TA in the measuring direction X with respect to the scanning gratings 151 of the first group, wherein m=0, 1, 2, . . . By means of the Blaze effect, the scanning gratings 152 essentially direct the impinging light beam only into the +1st transverse diffraction order. Following reflection at the scale grating 4, it is again deflected in the +1st transverse diffraction order during the second passage through the scanning grating 152, so that it exits in +2nd resultant transverse diffraction order and is focused by means of the lens 9 on the photo-detectors 64, 65 which detect the various longitudinal diffraction orders.

By means of the reversed Blaze angle φ1 of the scanning grating 151, the associated light beam is guided in an analogous manner on the photo-detectors 74, 75, which are again at a longitudinal distance from each other.

It is possible by means of a suitable design of the scanning areas 153, 154 and 155, 156 of the scanning gratings 151, 152 to phase-shift the scanning signals obtained from the photo-detectors 64, 65 and 74, 75 with respect to each other by a desired value. (See FIG. 17) For example, if the transverse grating areas 155, 156 have the same graduation period TT and are disposed transversely offset by 2 TT/3 with respect to each other, it is possible to achieve a phase shift of 90° between the scanning signals of the photo-detectors 64 and 65. Viewed in the measuring direction X, respectively one grating area 155 and one grating area 156 constitute a graduation period TA, wherein the width of the grating area 156 is approximately TA/3. As indicated in FIG. 17, the same conditions apply with respect to the grating areas 153 and 154 of the scanning grating 151 for achieving a phase shift by 90° between the scanning signals of the photo-detectors 74, 75.

Figures 18, 19:
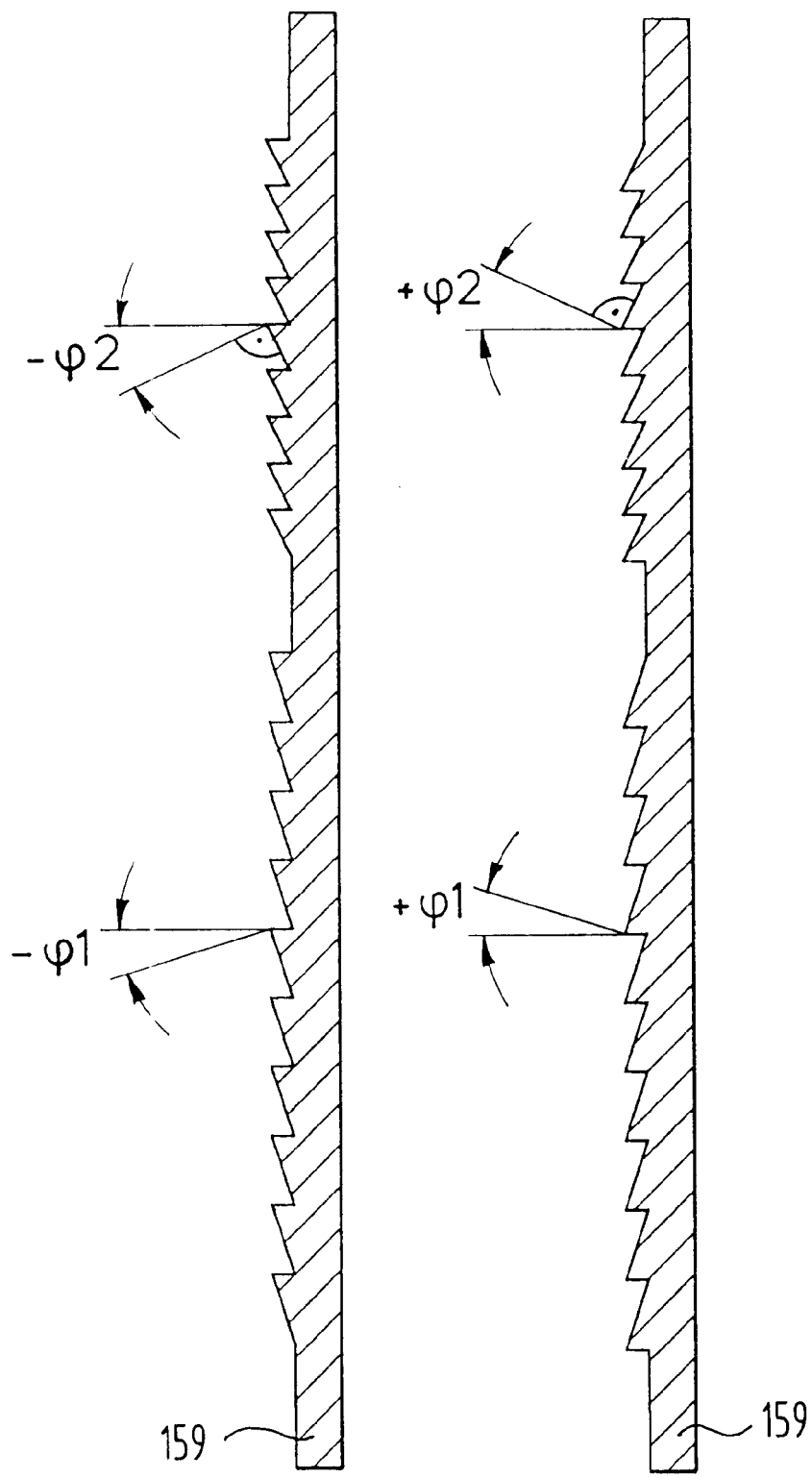
FIG. 18 is a cross-sectional view of the scanning grating shown in FIG. 17 taken along line I—I.
FIG. 19 is a cross-sectional view of the scanning grating shown in FIG. 17 taken along line II—II.

It is possible to set the phase shift of the scanning signals of the photo-detectors 64, 65 with respect to the photo-detectors 74, 75 by a geometric displacement of the grating area 152 with respect to the grating area 151. If this displacement is, for example, TA/4, the scanning signals of the photo-detectors 64, 65 are phase-shifted by 180° with respect to each other in comparison with the photo-detectors 74, 75. The customarily required four scanning signals, phase-shifted by 90° with respect to each other, can be obtained in a simple manner in this way, as well as the advantages of a single field scanning. The light yield in the transverse diffraction orders used (±1st) is particularly great in this exemplary embodiment if the suitable Blaze angle φ1 of the grating areas 153 to 156 is selected. The requirements for this are well known to those of ordinary skill in the art and can be found in the applicable technical books under "echelette grating". The employment of the echelette gratings, shown in particular in FIGS. 18 and 19, is especially advantageous if, as in the so-called three grating transmitters described in European Patent Publication No. EP 0 163 362 B1, the +nth and the −nth transverse diffraction orders are modulated in equiphase and therefore cannot provide any additional information.

Figure 17:
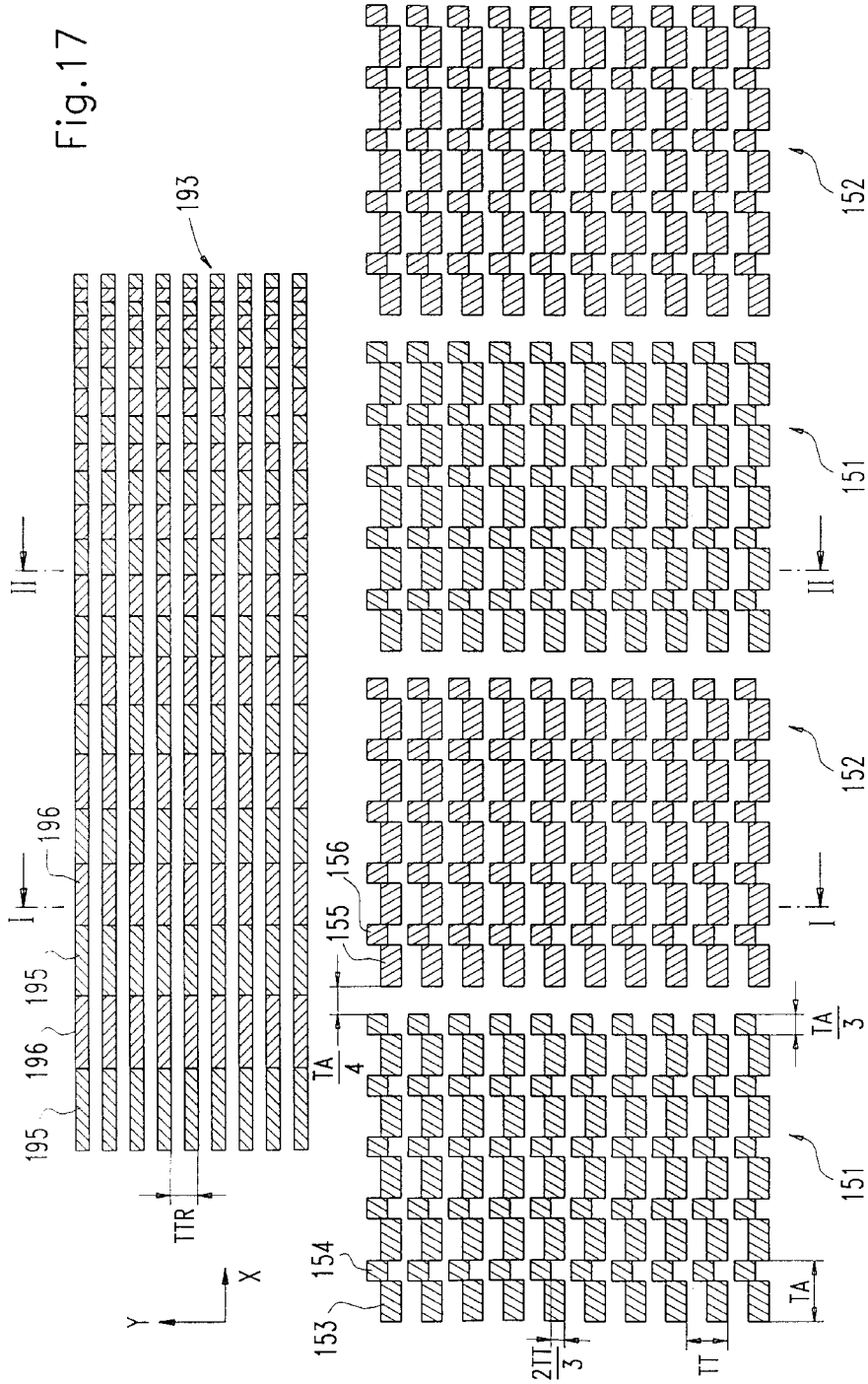
FIG. 17 is a front view of a scanning grating shown in the position measuring system of FIG. 16 according to a tenth preferred embodiment.

For a better distinction between the Blaze angles φ1, in FIG. 17 the grating areas 153, 154 with the downward directed Blaze angle φ1 are cross-hatched differently than the grating areas 155, 156 with an upward directed Blaze angle φ1.

In this exemplary embodiment the reference marking 193 also consists of a chirped scanning grating, which consists of grating areas 195 and 196 alternately disposed in the measuring direction X and whose widths continuously decrease in the measuring direction X. The grating areas 195 and 196 have opposite Blaze angles φ2, which can be seen in the sections I—I and II—II in FIGS. 18 and 19. The grating areas 195 guide the impinging light beam to the photo-detector 95, the grating areas 196 guide the impinging light beam to the photo-detector 96. In this way the photo-detectors 95 and 96 supply the timing or counter-timing signal of the chirped reference marking 194.

It is easily possible by means of a different selection of the transverse graduation periods TT, TTR and/or the Blaze angles φ1, φ2 to separate the individual diffracted light beams in the focal plane of the lens 9 by means of the use of transverse grating areas 153 to 156 and 195, 196 for incremental as well as reference marking scanning. In this way elaborate light-deflecting means, such as prisms or mirrors, are no longer required. The Blaze-angled grating represented can be made in a particularly advantageous manner by stamping.

A particular advantage of the scanning gratings in accordance with the present invention 1, 10, 20, 30, 40, 51, 52, 80, 50, 90 is that the local phase shift of the light beam diffracted in the +nth and −nth (n=1, 2, 3 . . . ) transverse diffraction order does not depend on the phase deviation and the strip width of the transverse grating, but instead is solely provided by the geometric displacement of the transverse grating areas 2, 3, 11 to 14, 21 to 24, 31, 32, 41, 42, 53 to 56, 81, 82, 91, 92. Because of this, the tolerances of the phase deviation and strip width of the transverse grating areas 2, 3, 11 to 14, 21 to 24, 31, 32, 41, 42, 53 to 56, 81, 82, 91, 92 are so great that production is cost-effective in comparison with conventional phase graduations.

In all embodiments the phase grating can be designed as a phase structure in the form of the surface relief represented in FIG. 2 or as a phase structure by means of a location-dependent variable refractive index, or also as an amplitude structure in the form of location-dependent variable reflection, absorption or transmission. The phase structure has the particular advantage that, as already explained, the light intensity can be directed into defined diffraction orders. It is therefore particularly advantageous to use the ±1st diffraction order, however, in accordance with the present invention it is also possible to employ other diffraction orders.

Since in connection with the grating in accordance with the present invention both the position of the markings in the Y direction and their width in the Y and X directions can be selected locally at will, it is possible in this way to produce any desired combination between a phase graduation and an amplitude graduation in a simple manner. It is possible by means of the grating in accordance with the present invention to select the desired phase shifts of the scanning signals directly derived from this grating and the scanning signals can be optimized in addition.

It is particularly advantageous if the scanning plate, which is relatively small in the measuring direction X, is embodied in accordance with the present invention. However, it is also within the scope of the present invention to design the scale correspondingly.

In all examples the photo-detectors can be disposed at different distances, i.e. independently of the angle of incidence of the partial light beams impinging on the lens 5 or 9, such as extensively explained in European Patent Publication No. EP 0 576 720 A2.

The present invention can be employed in connection with linear and angular measuring systems.

It is to be understood that the forms of the invention described herewith are to be taken as preferred examples and that various changes in the shape, size and arrangement of parts may be resorted to, without departing from the spirit of the present invention or scope of the claims.

What is claimed is:

1. A photo-electric position measuring system comprising:
   a source of light;
   a first grating located downstream of the source of light;
   a second grating displaceable with respect to the first grating in a measuring direction, the second grating located downstream of the first grating; and
   a plurality of photo-detectors located downstream of the second grating;
   wherein at least one of said first or second grating has at least a first and a second transverse grating areas disposed adjacent to one another in the measuring direction, these transverse grating areas having substantially the same transverse graduation period, the first and second transverse grating areas are phase shifted in a direction transverse to the measuring direction with respect to each other by a phase shift which deviates from 180°, and light from the light source is diffracted at the first and second transverse grating areas so that a diffraction order from the first transverse grating areas and a diffraction order from the second transverse grating areas impinge on at least a common photo-detector.

2. A photo-electric position measuring system according to claim 1 wherein the first and second transverse grating areas have markings that are parallel grating lines which form an angle of 0° with respect to the measuring direction.

3. A photo-electric position measuring system according to claim 1 wherein the first and second transverse grating areas are embodied in the form of either one of an amplitude grating or a phase grating.

4. A photo-electric position measuring system according to claim 3 wherein the first and second transverse grating areas form a phase grating whose parameters are selected in such a way that a zero-th transverse diffraction order is suppressed.

5. A photo-electric position measuring system according to claim 1 wherein respective partial light beams in a +1st and −1st diffraction order are generated at the first and second transverse grating areas which are disposed transversely offset, and a photo-detector for detecting the +1st diffraction order and a further photo-detector for detecting the −1st diffraction order are provided, wherein the two photo-detectors generate signals that are phase-shifted with respect to each other.

6. A photo-electric position measuring system according to claim 1 wherein the first and second transverse grating areas are provided on the first grating, the first and second transverse grating areas having transverse markings of the same graduation period wherein the first and second transverse grating areas are offset from one another by ¼ of the graduation period in a direction perpendicular to the measuring direction.

7. A photo-electric position measuring system according to claim 1 wherein the first and second transverse grating areas are provided on the first grating, the first and second transverse grating areas having transverse markings of the same graduation period the first and second transverse grating areas are offset with respect to each other by approximately ⅔ of the graduation period in a direction perpendicular to the measuring direction.

8. A photo-electric position measuring system according to claim 1 wherein the first and second transverse grating areas have equal widths in the measuring direction.

9. A photo-electric position measuring system according to claim 1 wherein the first and second transverse grating areas have different widths in the measuring direction and the ratio of the widths of the grating areas is 2:1.

10. A photo-electric position measuring system in according to claim 9 wherein the first and second transverse grating areas have the same transverse graduation period and are offset from each other in a direction perpendicular to the measuring direction by approximately ⅔ of the transverse graduation period.

11. A photo-electric position measuring system according to claim 1 wherein the first and second transverse grating areas have markings that have a phase shift in a direction perpendicular to the measuring direction that extends sinusoidally.

12. A photo-electric position measuring system according to claim 1 wherein the first and second transverse grating areas have markings that have a width in a direction perpendicular to the measuring direction and whose width varies as a function of a distance in the measuring direction.

13. A photo-electric position measuring system according to claim 1 wherein the transverse graduation period of the first and second transverse grating areas varies continuously along a path perpendicular to the measurement direction.

14. A photo-electric position measuring system according to claim 13 wherein a common photo-detector detects partial beams of a predetermined order of magnitude which are variously sharply deflected at local division periods of the first and second transverse grating areas.

15. A photo-electric position measuring system according to claim 1 comprising several transverse grating areas of different transverse graduation periods wherein a plurality of first transverse grating areas have the same first graduation period and form a first group, and a plurality of second transverse grating areas have the same second graduation period which is different from the first graduation period and the plurality of second transverse grating areas form a second group wherein the grating areas of the first group are disposed phase-shifted in the measuring direction with respect to the second group by a fraction or by a fraction plus a multiple of a longitudinal graduation period.

16. A photo-electric position measuring system according to claim 1 comprising, several transverse grating areas in the form of echelette gratings with different Blaze angles, wherein the transverse grating areas with the same Blaze angle respectively form a first group, and that the transverse grating areas of the first group are phase-shifted in the measuring direction with respect to transverse grating areas not having the same Blaze angle by a fraction or by a fraction plus a multiple of a longitudinal graduation period.

17. A photo-electric position measuring system according to claim 15 wherein the first and second groups are spaced apart in the measuring direction by (m+1/4)TA, wherein m=0, 1, 2, . . . and TA represents the longitudinal graduation period.

18. A photo-electric position measuring system according to claim 15 wherein light from the light source is diffracted into first diffracted light beams at the first transverse grating areas, which are transversely offset with respect to each other and are of the same graduation period or have the same Blaze angle, are directed to several photo-detectors, and first scanning signals are generated which are phase-shifted with respect to each other, and that further transverse grating areas, which are transversely offset with respect to each other, are provided, whose graduation periods Blaze angle differ from that of the first transverse grating areas, wherein by these further transverse grating areas second diffracted light beams are directed to further photo-detectors and at least a further scanning signal, which is phase-shifted with respect to the first scanning signals, is generated.

19. A photo-electric position measuring system according to claim 1 comprising a scanning plate and a scale grid wherein light from the light source, collimated by a lens impinges on the scanning plate having a scanning grating, and then upon the scale grid located downstream of the scanning plate to create partial light beams which are focused by a further lens onto several photo-detectors.

20. A photo-electric position measuring system according to claim 1 comprising a scanning plate and a reflective scale grid wherein light from the light source, collimated by a lens impinges on the scanning plate having a scanning grating, and then upon the scale grid located downstream of the scanning plate to create partial light beams which are again diffracted through the scanning grating and are focused on several photo-detectors by a lens.

21. A photo-electric position measuring system according to claim 19 wherein the scale grating and the scanning grating have the same graduation period in the measuring direction.

22. A photo-electric position measuring system according to claim 21 wherein the scale grating is either one of an amplitude or a phase grating.

23. A photo-electric position measuring system comprising:
   a source of light;
   a first grating located downstream of the source of light;
   a second grating displaceable with respect to the first grating in a measuring direction, the second grating located downstream of the first grating; and
   a plurality of photo-detectors located downstream of the second grating for generating position-dependent signals that are phase shifted with respect to each other;
   wherein at least one of said first or second grating has a plurality of transverse grating areas disposed adjacent to one another in the measuring direction, the plurality of transverse grating areas having a graduation period substantially the same, wherein the plurality of transverse areas are phase shifted in a direction transverse to the measuring direction with respect to each other by a phase shift which deviates from 180°; and light from the light source is diffracted at the plurality of transverse grating areas so that a plurality of diffraction orders result wherein a first diffraction order creates a first interference strip system and a second diffraction order creates a second interference strip system, wherein both the first and second interference strip systems are phase shifted with respect to each other.

24. A photo-electric position measuring system according to claim 23 wherein the first and second transverse grating areas have markings that are parallel grating lines which form an angle of 0° with respect to the measuring direction.

25. A photo-electric position measuring system according to claim 23 wherein the first and second transverse grating areas are embodied in the form of either one of an amplitude grating or a phase grating.

26. A photo-electric position measuring system according to claim 25 wherein the first and second transverse grating areas form a phase grating whose parameters are selected in such a way that a zero-th transverse diffraction order is suppressed.

27. A photo-electric position measuring system according to claim 23 wherein respective partial light beams in a +1st and −1st diffraction order are generated at the first and second transverse grating areas which are disposed transversely offset, and a photo-detector for detecting the +1st diffraction order and a further photo-detector for detecting the −1st diffraction order are provided, wherein the two photo-detectors generate signals that are phase-shifted with respect to each other.

28. A photo-electric position measuring system according to claim 23 wherein the first and second transverse grating areas are provided on the first grating, the first and second transverse grating areas having transverse markings of the same graduation period wherein the first and second transverse grating areas are offset from one another by ¼ of the graduation period in a direction perpendicular to the measuring direction.

29. A photo-electric position measuring system according to claim 23 wherein the first and second transverse grating areas are provided on the first grating, the first and second transverse grating areas having transverse markings of the same graduation period the first and second transverse grating areas are offset with respect to each other by approximately ⅔ of the graduation period in a direction perpendicular to the measuring direction.

30. A photo-electric position measuring system according to claim 23 wherein the first and second transverse grating areas have equal widths in the measuring direction.

31. A photo-electric position measuring system according to claim 23 wherein the first and second transverse grating areas have different widths in the measuring direction and the ratio of the widths of the grating areas is 2:1.

32. A photo-electric position measuring system in according to claim 31 wherein the first and second transverse grating areas have the same transverse graduation period and are offset from each other in a direction perpendicular to the measuring direction by approximately ⅔ of the transverse graduation period.

33. A photo-electric position measuring system according to claim 23 wherein the first and second transverse grating areas have markings that have a phase shift in a direction perpendicular to the measuring direction that extends sinusoidally.

34. A photo-electric position measuring system according to claim 23 wherein the first and second transverse grating areas have markings that have a width in a direction perpendicular to the measuring direction and whose width varies as a function of a distance in the measuring direction.

35. A photo-electric position measuring system according to claim 23 wherein the transverse graduation period of the first and second transverse grating areas varies continuously along a path perpendicular to the measurement direction.

36. A photo-electric position measuring system according to claim 35 wherein a common photo-detector detects partial beams of a predetermined order of magnitude which are variously sharply deflected at local division periods of the first and second transverse grating areas.

37. A photo-electric position measuring system according to claim 23 comprising several transverse grating areas of different transverse graduation periods wherein a plurality of first transverse grating areas have the same first graduation period and form a first group, and a plurality of second transverse grating areas have the same second graduation period which is different from the first graduation period and the plurality of second transverse grating areas form a second group wherein the grating areas of the first group are disposed phase-shifted in the measuring direction with respect to the second group by a fraction or by a fraction plus a multiple of a longitudinal graduation period.

38. A photo-electric position measuring system according to claim 23 comprising, several transverse grating areas in the form of echelette gratings with different Blaze angles, wherein the transverse grating areas with the same Blaze angle respectively form a first group, and that the transverse grating areas of the first group are phase-shifted in the measuring direction with respect to transverse grating areas not having the same Blaze angle by a fraction or by a fraction plus a multiple of a longitudinal graduation period.

39. A photo-electric position measuring system according to claim 37 wherein the first and second groups are spaced apart in the measuring direction by (m+1/4)TA, wherein m=0, 1, 2, . . . and TA represents the longitudinal graduation period.

40. A photo-electric position measuring system according to claim 38 wherein light from the light source is diffracted into first diffracted light beams at the first transverse grating areas, which are transversely offset with respect to each other and are of the same graduation period or have the same Blaze angle, are directed to several photo-detectors, and first scanning signals are generated which are phase-shifted with respect to each other, and that further transverse grating areas, which are transversely offset with respect to each other, are provided, whose graduation periods or Blaze angle differ from that of the first transverse grating areas, wherein by these further transverse grating areas second diffracted light beams are directed to further photo-detectors and at least a further scanning signal, which is phase-shifted with respect to the first scanning signals, is generated.

41. A photo-electric position measuring system according to claim 23 comprising a scanning plate and a scale grid wherein light from the light source, collimated by a lens impinges on the scanning plate having a scanning grating, and then upon the scale grid located downstream of the scanning plate to create partial light beams which are focused by a further lens onto several photo-detectors.

42. A photo-electric position measuring system according to claim 23 comprising a scanning plate and a reflective scale grid wherein light from the light source, collimated by a lens impinges on the scanning plate having a scanning grating, and then upon the scale grid located downstream of the scanning plate to create partial light beams which are again diffracted through the scanning grating and are focused on several photo-detectors by a lens.

43. A photo-electric position measuring system according to claim 41 wherein the scale grating and the scanning grating have the same graduation period in the measuring direction.

44. A photo-electric position measuring system according to claim 43 wherein the scale grating is either one of an amplitude or a phase grating.

45. A photo-electric position measuring system comprising:
a source of light;
a first grating located downstream of the source of light;
a second grating displaceable with respect to the first grating in a measuring direction, the second grating located downstream of the first grating;
wherein at least one of said first or second grating has at least a first and second transverse grating areas disposed adjacent to one another in the measuring direction, the first and second transverse grating areas having a transverse graduation period substantially the same, the first and second grating areas are phase shifted in a direction transverse to the measuring direction with respect to each other by a phase shift which deviates from 180°, and light from the light source is diffracted at the first and second transverse grating areas so that a transverse diffraction order of the first transverse grating areas and a transverse diffraction order of the second transverse grating area impinge on a first common photo-detector and wherein the grating has at least a further third and fourth transverse grating areas disposed adjacent to one another in the measuring direction, the third and fourth transverse grating areas having substantially the same transverse graduation period, and are phase shifted in a direction transverse to the measuring direction with respect to each other by a phase shift which deviates from 180°, and light from the light source is diffracted at the third and fourth transverse grating areas so that a transverse diffraction order of the third transverse grating areas and a transverse diffraction order of the fourth transverse grating areas impinge on a further second common photo-detector, thus the first and second common photo-detectors generate two position-dependent signals that are phase shifted with respect to each other.

46. A photo-electric position measuring system according to claim 1 wherein a first diffraction order from the first transverse grating areas and a first diffraction order from the second transverse grating areas creates a first interference strip system and impinge on at least a common first photo-detector and wherein a second diffraction order from the first transverse grating areas and a second diffraction order from the second transverse grating areas creates a second interference strip system and impinge on at least a common second photo-detector, so that the first and second photo-detectors generate two position-dependent signals that are phase shifted with respect to each other.

47. A photo-electric position measuring system according to claim 45 wherein the transverse grating period of the first and second transverse grating areas varies from the transverse grating period of the third and fourth transverse grating areas.

48. A photo-electric position measuring system according to claim 16 wherein light from the light source is diffracted into first diffracted light beams at the first transverse grating areas, which are transversely offset with respect to each other and are of the same graduation period or have the same Blaze angle, are directed to several photo-detectors, and first scanning signals are generated which are phase-shifted with respect to each other, and that further transverse grating areas, which are transversely offset with respect to each other, are provided, whose graduation periods or Blaze angle differ from that of the first transverse grating areas, wherein by these further transverse grating areas second diffracted light beams are directed to further photo-detectors and at least a further scanning signal, which is phase-shifted with respect to the first scanning signals, is generated.

49. A photo-electric position measuring system according to claim 39 wherein light from the light source is diffracted into first diffracted light beams at the first transverse grating areas, which are transversely offset with respect to each other and are of the same graduation period or have the same Blaze angle, are directed to several photo-detectors, and first scanning signals are generated which are phase-shifted with respect to each other, and that further transverse grating areas, which are transversely offset with respect to each other, are provided, whose graduation periods or Blaze angle differ from that of the first transverse grating areas, wherein by these further transverse grating areas second diffracted light beams are directed to further photo-detectors and at least a further scanning signal, which is phase-shifted with respect to the first scanning signals, is generated.

* * * * *

UNITED STATES PATENT AND TRADEMARK OFFICE
CERTIFICATE OF CORRECTION

PATENT NO. : 5,994,692
DATED : November 30, 1999
INVENTOR(S) : Wolfgang Holzapfel It is certified that error appears in the above-identified patent and that said Letters Patent is hereby corrected as shown below:

In claim 10, line 1, delete "in".

In claim 16, line 2, delete "comprising," and substitute --comprising:-- in its place.

In claim 32, line 1, delete "in".

In claim 38, line 2, delete "comprising," and substitute --comprising:-- in its place.

Signed and Sealed this

Twenty-second Day of May, 2001

Attest:

NICHOLAS P. GODICI

*Attesting Officer*   *Acting Director of the United States Patent and Trademark Office*